US012792059B1

(12) United States Patent
(10) Patent No.: US 12,792,059 B1
(45) Date of Patent: Nov. 10, 2026

Fotouhi et al.

(54) GUIDANCE ZONES BASED ON HISTORICAL MACHINE PATH DATA

(71) Applicant: Deere & Company, Moline, IL (US)

(72) Inventors: Mo Fotouhi, Madison, WI (US); Jared T. Grove, Los Alamos, NM (US); Dylan James Roth, Austin, TX (US); Prajakta Ajit Mandavgane, Pune (IN); William Z. Chen, Brooklyn, NY (US); Rishab Arya Paruchuri, Atlanta, GA (US); Alisha N. Schwertner, Miles, TX (US); Steven W. Beckert, Clive, IA (US); Kevin Synoga, Homer Glen, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/205,333

(22) Filed: May 12, 2025

(51) Int. Cl.
*G05D 1/646* (2024.01)
*G05D 101/15* (2024.01)
(Continued)

(52) U.S. Cl.
CPC ............. *G05D 1/646* (2024.01); *G06V 10/26* (2022.01); *G06V 10/751* (2022.01); *G06V 20/56* (2022.01);
(Continued)

(58) Field of Classification Search
CPC ............. A01D 34/008; A01D 41/1278; B60W 2420/403; B60W 2420/408; B60W 2552/30; B60W 2552/53; B60W 2554/20; B60W 2554/40; B60W 2554/60; B60W 2555/60; B60W 2556/35; B60W 2556/40; B60W 2556/45; B60W 2556/50; B60W 2710/18; B60W 2710/20; B60W 2720/10; B60W 30/10; B60W 30/14; B60W 30/18; B60W 40/06; B60W 60/00; B60W 60/0015; B60W 60/00274; A01C 11/02; A01C 21/005; A01C 7/102; G01S 13/867; G01S 19/10; G01S 2013/93271; G01S 5/0027; G01S 5/16; A01B 69/008; A01B 69/00; A01B 69/002; A01B 69/02; A01B 79/005; G06F 2113/14; G06F 2113/16; G06F 3/0484; G06F 30/12; G06F 30/13;
(Continued)

(56) References Cited

U.S. PATENT DOCUMENTS 5,764,518 A * 6/1998 Collins .................. B25J 9/1617
700/95
6,996,272 B2 * 2/2006 Chen ......................... G06T 7/11
382/164

(Continued)

*Primary Examiner* — Bhavesh V Amin
(74) *Attorney, Agent, or Firm* — Young Basile Hanlon & MacFarlane, P.C.

(57) ABSTRACT

Generating a guidance zone in a field for a machine is described. A field boundary and historical machine path data are obtained. The historical machine path data includes a plurality of machine paths. The plurality of machine paths are segmented into machine tracks, and each machine track includes respective position data and corresponding heading angle data. At least one cluster of paths including individual machine tracks associated with a similar heading angle is identified. The guidance zone is generated based on the at least one cluster of paths and the field boundary. The guidance zone includes the at least one cluster of paths.

20 Claims, 9 Drawing Sheets

(51) Int. Cl.

| | |
|---|---|
| ***G05D 105/15*** | (2024.01) |
| ***G05D 107/20*** | (2024.01) |
| ***G05D 109/10*** | (2024.01) |
| ***G05D 111/10*** | (2024.01) |
| ***G06V 10/26*** | (2022.01) |
| ***G06V 10/75*** | (2022.01) |
| ***G06V 20/56*** | (2022.01) |

(52) U.S. Cl.

CPC ..... *G05D 2101/15* (2024.01); *G05D 2105/15* (2024.01); *G05D 2107/21* (2024.01); *G05D 2109/10* (2024.01); *G05D 2111/10* (2024.01)

(58) Field of Classification Search

CPC .......... G06F 30/18; G06F 30/20; G06F 30/27; G06F 18/217; G06F 18/251; G06F 18/28; G06F 40/30; G06F 1/163; G06F 16/3325; G06F 16/3329; G06F 18/2163; G06F 18/22; G06F 18/24; G06F 3/04817; G06F 16/2379; G06F 16/29; G06F 16/53; G06F 16/55; G06F 16/56; G06F 16/583; G06F 16/5846; G06F 18/211; G06F 18/214; G06F 18/23; G06F 18/2323; G06F 18/241; G06F 18/2411; G06F 18/2415; G06F 18/2431; G06F 18/24323; G06F 18/253; G06F 18/285; G06F 21/32; G05D 1/646; G05D 2101/15; G05D 2105/15; G05D 2107/21; G05D 2109/10; G06V 10/26; G06V 10/751; G06V 20/56

See application file for complete search history.

(56) References Cited

U.S. PATENT DOCUMENTS

| | | | | |
|---|---|---|---|---|
| 8,467,607 | B1 * | 6/2013 | Toshev | G06V 10/50 382/199 |
| 8,634,593 | B2 * | 1/2014 | Zhang | G06V 20/588 382/104 |
| 9,206,309 | B2 * | 12/2015 | Appleby | B22C 9/04 |
| 9,224,068 | B1 * | 12/2015 | Ranzato | G06N 3/0464 |
| 9,315,663 | B2 * | 4/2016 | Appleby | B22C 9/04 |
| 9,336,456 | B2 * | 5/2016 | DeLean | G06V 40/20 |
| 9,360,276 | B1 * | 6/2016 | Meek | F41C 33/041 |
| 9,414,016 | B2 * | 8/2016 | Lin | G06T 7/149 |
| 9,483,701 | B1 * | 11/2016 | Kwatra | G06V 10/255 |
| 9,493,195 | B1 * | 11/2016 | Willis | B62D 53/067 |
| 9,880,010 | B2 * | 1/2018 | Miksa | G01C 11/02 |
| 10,207,315 | B2 * | 2/2019 | Appleby | B22C 9/04 |
| 10,363,670 | B1 * | 7/2019 | Gundling | B25J 18/06 |
| 10,395,126 | B2 * | 8/2019 | Lu | G06T 7/74 |
| 10,551,690 | B2 * | 2/2020 | Milton | G02F 1/13439 |
| 10,825,188 | B1 * | 11/2020 | Tan | G05D 1/0088 |
| 10,967,526 | B1 * | 4/2021 | Gundling | B25J 9/1075 |
| 10,997,325 | B2 * | 5/2021 | Austern | G06F 30/12 |
| 11,087,054 | B2 * | 8/2021 | Austern | G06F 30/12 |
| 11,093,671 | B2 * | 8/2021 | Segev | G06F 30/12 |
| 11,100,265 | B2 * | 8/2021 | Segev | G06F 30/12 |
| 11,106,842 | B2 * | 8/2021 | Segev | G06F 30/12 |
| 11,199,748 | B2 * | 12/2021 | Milton | G02F 1/1345 |
| 11,227,083 | B2 * | 1/2022 | Austern | G06F 30/12 |
| 11,295,542 | B2 * | 4/2022 | Deng | H04L 67/12 |
| 11,392,736 | B2 * | 7/2022 | Austern | G06F 30/12 |
| 11,520,955 | B2 * | 12/2022 | Levy | G06F 30/12 |
| 11,635,661 | B2 * | 4/2023 | Milton | G02F 1/134309 349/139 |
| 11,967,059 | B2 | 4/2024 | Anderson et al. | |
| 12,446,482 | B2 * | 10/2025 | Morimoto | A01B 69/008 |
| 12,510,891 | B2 * | 12/2025 | Kameyama | G05D 1/0088 |
| 12,514,142 | B2 * | 1/2026 | Suzuki | A01B 69/008 |
| 2005/0163382 | A1 * | 7/2005 | Herley | H04N 1/00702 382/199 |
| 2009/0141940 | A1 * | 6/2009 | Zhao | G06T 7/248 382/103 |
| 2009/0161982 | A1 * | 6/2009 | Tico | G06T 5/20 382/268 |
| 2010/0014781 | A1 * | 1/2010 | Liu | H04N 13/128 382/285 |
| 2010/0158376 | A1 * | 6/2010 | Klosterman | G06V 10/457 382/180 |
| 2016/0082502 | A1 * | 3/2016 | Appleby | B22C 9/04 164/369 |
| 2019/0171886 | A1 * | 6/2019 | Ashour | G06V 20/49 |
| 2019/0325241 | A1 * | 10/2019 | Nunn | G06T 7/11 |
| 2019/0347468 | A1 * | 11/2019 | Li | G06F 18/2163 |
| 2019/0384294 | A1 * | 12/2019 | Shashua | G01C 21/30 |
| 2020/0117900 | A1 * | 4/2020 | Deng | H04L 67/12 |
| 2020/0175290 | A1 * | 6/2020 | Raja | G06F 21/32 |
| 2020/0349668 | A1 * | 11/2020 | Desnoyer | G06F 16/55 |
| 2021/0073430 | A1 * | 3/2021 | Levy | G06F 30/12 |
| 2021/0073433 | A1 * | 3/2021 | Austern | G06F 30/12 |
| 2021/0073434 | A1 * | 3/2021 | Levy | G06F 30/12 |
| 2021/0073435 | A1 * | 3/2021 | Segev | G06F 30/12 |
| 2021/0073440 | A1 * | 3/2021 | Austern | G06F 30/12 |
| 2021/0073441 | A1 * | 3/2021 | Austern | G06F 30/12 |
| 2021/0073442 | A1 * | 3/2021 | Austern | G06F 30/12 |
| 2021/0073446 | A1 * | 3/2021 | Levy | G06F 30/12 |
| 2021/0073447 | A1 * | 3/2021 | Levy | G06F 30/12 |
| 2021/0073448 | A1 * | 3/2021 | Segev | G06F 30/12 |
| 2021/0073449 | A1 * | 3/2021 | Segev | G06F 30/12 |
| 2021/0150721 | A1 * | 5/2021 | Yohanandan | G06N 3/045 |
| 2021/0172757 | A1 * | 6/2021 | Chen | G01C 21/3602 |
| 2021/0256052 | A1 * | 8/2021 | Luo | G06N 3/045 |
| 2021/0256180 | A1 * | 8/2021 | Austern | G06F 30/12 |
| 2021/0383037 | A1 * | 12/2021 | Segev | G06F 30/12 |
| 2022/0189088 | A1 * | 6/2022 | Bala | G06V 20/62 |
| 2022/0343507 | A1 * | 10/2022 | Shi | G06T 11/60 |
| 2023/0153485 | A1 * | 5/2023 | Austern | G06F 30/12 703/1 |
| 2023/0177836 | A1 * | 6/2023 | Solmaz | G06N 20/20 382/100 |
| 2023/0252784 | A1 * | 8/2023 | Ahmed | G06V 40/10 382/103 |
| 2023/0292645 | A1 * | 9/2023 | Ishikawa | A01B 69/008 701/25 |
| 2023/0380322 | A1 * | 11/2023 | Suzuki | A01B 69/008 |
| 2023/0401505 | A1 * | 12/2023 | Miyake | A01B 69/008 |
| 2024/0029272 | A1 * | 1/2024 | Li | G06T 7/11 |
| 2024/0081167 | A1 * | 3/2024 | Morimoto | A01B 69/008 |
| 2024/0196779 | A1 * | 6/2024 | Shimada | A01B 69/007 |
| 2024/0244988 | A1 * | 7/2024 | Shimada | A01B 69/008 |
| 2024/0362909 | A1 * | 10/2024 | Melnitchouck | G06V 10/32 |
| 2026/0010729 | A1 * | 1/2026 | Galvin | G06F 40/30 |
| 2026/0050744 | A1 * | 2/2026 | Galvin | G06F 40/30 |

* cited by examiner

GUIDANCE ZONES BASED ON HISTORICAL MACHINE PATH DATA

TECHNICAL FIELD

This disclosure relates generally to agricultural field management, and more specifically to guidance zones based on historical machine path data.

BACKGROUND

In farming operations, a field may contain different zones used for different purposes. For example, zones may facilitate crop rotation, ensure that soil nutrients are maintained, and minimize pests and diseases by varying the types of crops grown in specific areas over time. In another example, zones may facilitate simultaneous cultivation of multiple crop types by planting different crops in different zones of the same field, enabling diversified production and optimized land use.

SUMMARY

Disclosed herein are implementations of generating a guidance zone based on historical machine path data.

In an aspect of the present disclosure, a method is disclosed. The method includes obtaining a field boundary and historical machine path data for a field. The historical machine path data includes a plurality of machine paths. The plurality of machine paths are segmented into machine tracks, and each machine track includes respective position data and corresponding heading angle data. The method further includes identifying at least one cluster of paths including individual machine tracks associated with a similar heading angle and generating, based on the at least one cluster of paths, at least one guidance zone within the field boundary. The at least one guidance zone includes the individual machine tracks of the at least one cluster of paths.

In certain configurations, identifying the at least one cluster of paths includes creating a raster image by projecting the machine paths onto an image of the field, assigning at least one visual attribute to pixels of the image based on a heading angle associated with the plurality of machine paths at the pixels, and identifying, by applying an image segmentation model to the raster image, the at least one cluster of paths including individual machine tracks associated with a similar heading angle, and generating the at least one guidance zone includes filtering the at least one cluster of paths based on size and shape characteristics to obtain at least one filtered region, and converting the at least one filtered region into at least one guidance zone polygon.

In certain configurations, identifying, by applying the image segmentation model to the raster image, the at least one cluster of paths includes identifying a first cluster of paths based on a first visual attribute and identifying a second cluster of paths based on a second visual attribute, and converting the at least one filtered region into at least one guidance zone polygon includes generating a first guidance zone polygon including individual machine tracks of the first cluster of paths and generating a second guidance zone polygon including individual machine tracks of the second cluster of paths.

In certain configurations, the method further includes generating vector values of the at least one guidance zone by projecting a guidance zone polygon of the at least one guidance zone polygon onto an image of the field and converting the guidance zone polygon to latitude and longitude values.

In certain configurations, identifying the at least one cluster of paths includes using a computer vision and machine learning (CVML) model to detect individual machine tracks associated with a similar heading angle.

In certain configurations, identifying the at least one cluster of paths includes clustering data points within the historical machine path data to cluster individual machine tracks associated with a similar heading angle.

In certain configurations, the method further includes identifying, based on the plurality of machine paths, at least one headland of the field and generating the at least one guidance zone includes generating the at least one guidance zone to exclude the at least one headland.

In certain configurations, identifying the at least one headland includes identifying changes in heading angle of machine paths near a boundary of the field, identifying overlapping machine paths near the boundary of the field, and generating the at least one headland based on the changes in heading angle and the overlapping machine paths.

In certain configurations, identifying the at least one cluster of paths comprises identifying a cluster of curved individual machine tracks including individual machine tracks associated with a similar change in heading angle.

In certain configurations, the method further includes generating, using the at least one guidance zone, a planned path for a machine to traverse the field and traversing, autonomously by the machine, the planned path.

In certain configurations, the method further includes processing, before identifying the at least one cluster of paths, the historical machine path data to remove nonconforming machine paths. The processing includes identifying and filtering machine status data including at least one of active implement status, machine speed, or machine heading, normalizing heading angle data across the machine paths, and removing nonconforming data points associated with machine idle states or implement inactive states.

In certain configurations, the historical machine path data comprises historical data associated with at least one of a moving status, a turning status, a working status, or a location.

In certain configurations, the method further includes segmenting the plurality of machine paths into individual machine tracks by examining at least one of turns, timestamps, sessions, or machine status.

In certain configurations, the method further includes segmenting the plurality of machine paths into the machine tracks by analyzing sequential position data points to identify turns based on heading angle changes, grouping position data points between identified turns into individual machine tracks, and classifying the individual machine tracks as straight individual machine tracks or curved individual machine tracks based on heading angle variation, and filtering the individual machine tracks based on at least one of timestamps, machine operating sessions, or implement status.

In another aspect of the present disclosure, a system includes one or more memories and one or more processors. The one or more processors may be configured to execute instructions stored in the one or more memories to perform the method or any of the configurations described above.

In another aspect of the present disclosure, a non-transitory computer-readable storage medium includes executable instructions that, when executed by one or more processors, facilitate performance of operations. The operations may include operations that perform the method or any of the configurations described above.

In another aspect of the present disclosure, a system includes one or more memories and one or more processors. The one or more processors are configured to execute instructions stored in the one or more memories to obtain a field boundary and historical machine path data for a field. The historical machine path data includes a plurality of machine paths. The plurality of machine paths are segmented into machine tracks, and each machine track includes respective position data and corresponding heading angle data. The one or more processors are further configured to execute instructions to identify at least one cluster of paths including individual machine tracks associated with a similar heading angle and generate, based on the at least one cluster of paths, at least one guidance zone within the field boundary. The at least one guidance zone includes the individual machine tracks of the at least one cluster of paths.

In certain configurations, the one or more processors may be further configured to execute instructions stored in the one or more memories to identify, based on the machine paths, at least one headland of the field. The instructions to generate the at least one guidance zone include instructions to generate the at least one guidance zone to exclude the at least one headland.

In certain configurations, the one or more processors may be further configured to execute instructions stored in the one or more memories to display the at least one headland at a client device and display a split line separating a first guidance zone and a second guidance zone.

In certain configurations, the one or more processors may be further configured to execute instructions stored in the one or more memories to receive, from a client device, desired crop yield information and determine a guidance zone of the at least one guidance zone corresponding to the desired crop yield information.

In certain configurations, the one or more processors may be further configured to execute instructions stored in the one or more memories to display the at least one guidance zone at a client device.

In another aspect of the present disclosure, one or more non-transitory computer readable media storing instructions operable to cause one or more processors to perform operations are disclosed. The operations include obtaining a field boundary and historical machine path data for a field. The historical machine path data includes a plurality of machine paths. The plurality of machine paths are segmented into machine tracks, and each machine track includes respective position data and corresponding heading angle data. The operations further include identifying at least one cluster of paths including individual machine tracks associated with a similar heading angle and generating, based on the at least one cluster of paths, at least one guidance zone within the field boundary. The at least one guidance zone includes the individual machine tracks of the at least one cluster of paths.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In farming operations, a field may contain different zones used for different purposes, for example, crop rotation or simultaneous cultivation of different crops. These zones may be guidance zones generated to help farmers more efficiently operate machines within their fields. A guidance zone may be a specific area within an agricultural field that is delineated to guide machinery operations (e.g., plowing, planting, harvesting, spraying). A guidance zone refers to a specific area within a field delineated based on machine paths having similar heading angles. Similar heading angles refer to heading angles that differ by less than a threshold amount, such as 0.5°, 1°, 2°, or 5°.

Disclosed herein are techniques for generating guidance zones within a field by leveraging historical machine path data (i.e., machine status, heading direction, GPS location) and agronomic data about the land (i.e., field boundaries). Algorithms may pre-process this data and generate guidance zone artifacts. Generating the guidance zone artifacts may include the detection of straight and/or curved tracks and headland areas and the generation of split lines between guidance zones. The guidance zones may be generated for different heading directions based on the historical machine path data. The guidance zone artifacts may be harnessed to construct geo-referenced guidance zones within a field. The guidance zones can then be used to optimize efficiency and productivity in farming operations, such as to facilitate or implement autonomous farming technologies.

Guidance zones can influence machine control by enabling automated path planning and unlocking opportunities for autonomous solutions. Guidance zones may be generated and recommended to a customer based on historical information, for example, historical information corresponding to the field, the customer, the guidance zone, or the like.

Figure 1:
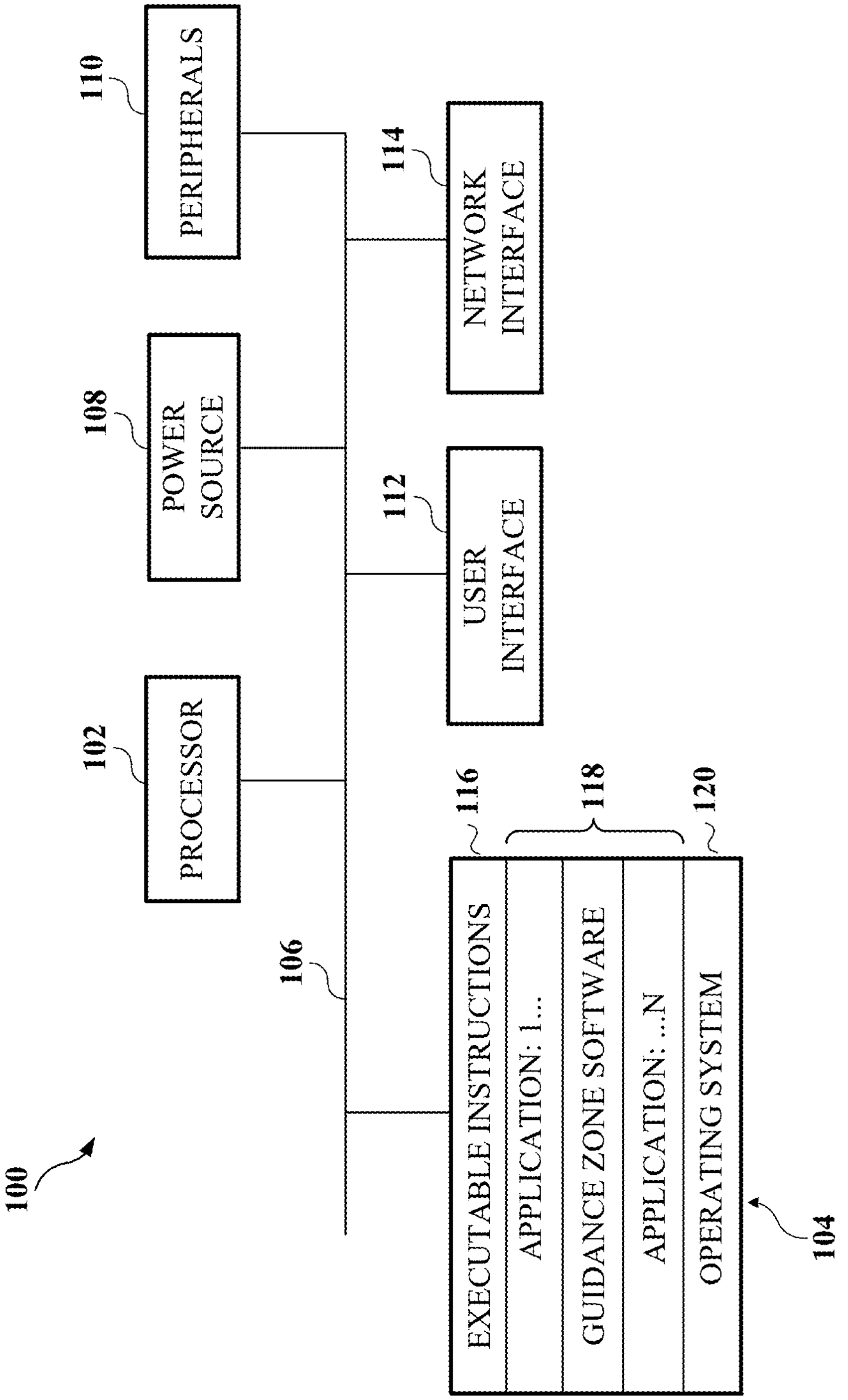
FIG. 1 is a block diagram of an example internal configuration of a computing device.

To describe some implementations in greater detail, reference is first made to examples of hardware and software structures used to generate guidance zones. FIG. 1 is a block diagram of an example internal configuration of a computing device 100.

The computing device 100 includes components or units, such as a processor 102, a memory 104, a bus 106, a power source 108, peripherals 110, a user interface 112, a network interface 114, other suitable components, or a combination thereof. One or more of the memory 104, the power source

108, the peripherals 110, the user interface 112, or the network interface 114 can communicate with the processor 102 via the bus 106.

The processor 102 is a central processing unit, such as a microprocessor, and can include single or multiple processors having single or multiple processing cores. Alternatively, the processor 102 can include another type of device, or multiple devices, configured for manipulating or processing information. For example, the processor 102 can include multiple processors interconnected in one or more manners, including hardwired or networked. The operations of the processor 102 can be distributed across multiple devices or units that can be coupled directly or across a local area or other suitable type of network. The processor 102 can include a cache, or cache memory, for local storage of operating data or instructions. In some cases, the processor 102 may correspond to processing circuitry that includes one or more processors arranged in one or more processing units. The one or more processing units may include, for example, at least one of a central processing unit or a graphics processing unit.

The memory 104 includes one or more memory components, which may each be volatile memory or non-volatile memory. For example, the volatile memory can be random access memory (RAM) (e.g., a DRAM module, such as DDR SDRAM). In another example, the non-volatile memory of the memory 104 can be a disk drive, a solid state drive, flash memory, or phase-change memory. In some implementations, the memory 104 can be distributed across multiple devices. For example, the memory 104 can include network-based memory or memory in multiple clients or servers performing the operations of those multiple devices. In some cases, the memory 104 corresponds to a memory subsystem that includes one or more memories. The memory subsystem may include at least one of a cache unit, a storage unit, a disk, an internal memory, an external memory, or a removable memory.

The memory 104 can include data for immediate access by the processor 102. For example, the memory 104 can include executable instructions 116, application data 118, and an operating system 120. The executable instructions 116 can include one or more application programs, which can be loaded or copied, in whole or in part, from non-volatile memory to volatile memory to be executed by the processor 102. For example, the executable instructions 116 can include instructions for performing some or all of the techniques of this disclosure. The application data 118 can include user data, database data (e.g., database catalogs or dictionaries), or the like. In some implementations, the application data 118 can include functional programs, such as a web browser, a web server, a database server, another program, or a combination thereof. The operating system 120 can be, for example, Microsoft Windows®, Mac OS X®, or Linux®; an operating system for a mobile device, such as a smartphone or tablet device; or an operating system for a non-mobile device, such as a mainframe computer.

The power source 108 provides power to the computing device 100. For example, the power source 108 can be an interface to an external power distribution system. In another example, the power source 108 can be a battery, such as where the computing device 100 is a mobile device or is otherwise configured to operate independently of an external power distribution system. In some implementations, the computing device 100 may include or otherwise use multiple power sources. In some such implementations, the power source 108 can be a backup battery.

The peripherals 110 includes one or more sensors, detectors, or other devices configured for monitoring the computing device 100 or the environment around the computing device 100. For example, the peripherals 110 may include a sensor, such as a camera, a microphone, a thermometer, or a pressure sensor. In another example, the peripherals 110 may include a geolocation component, such as a global positioning system (GPS) location unit. In another example, the peripherals may include a temperature sensor for measuring temperatures of components of the computing device 100, such as the processor 102. In some implementations, the computing device 100 can omit the peripherals 110.

The user interface 112 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 114 provides a connection or link to a network (e.g., at least one of a cellular network, a wired network, a wireless network, a local area network, or a wide area network). The network interface 114 can be a wired network interface or a wireless network interface. The computing device 100 can communicate with other devices via the network interface 114 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 2A:
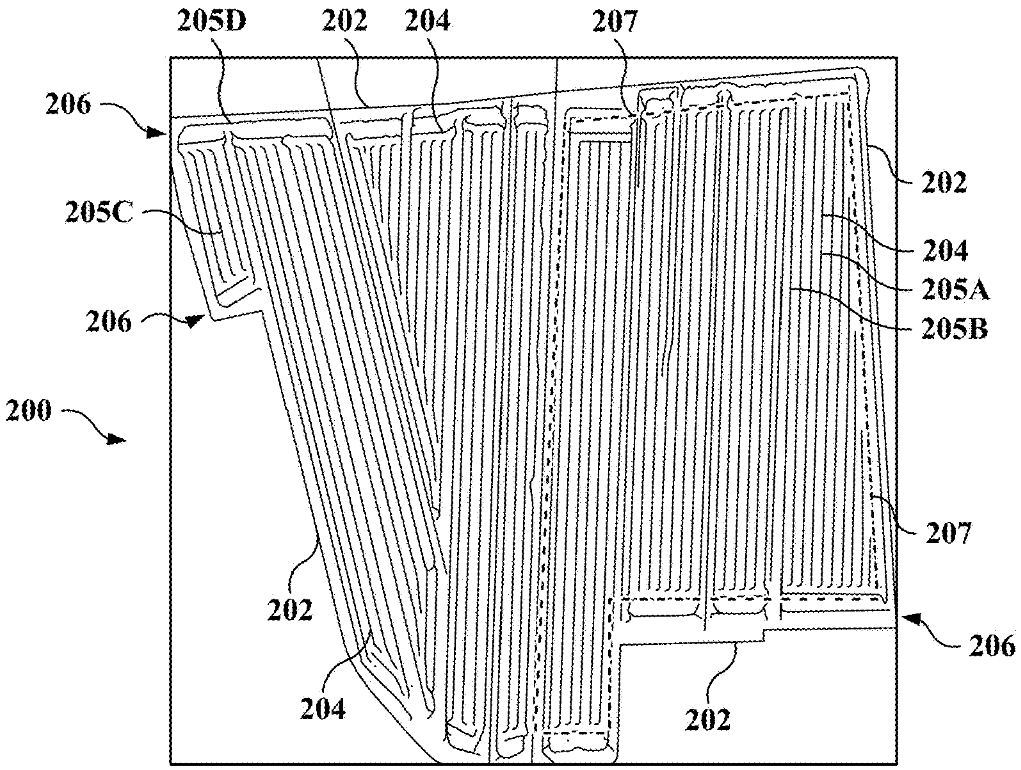
FIG. 2A illustrates historical machine path data within a field.
Figure 2B:
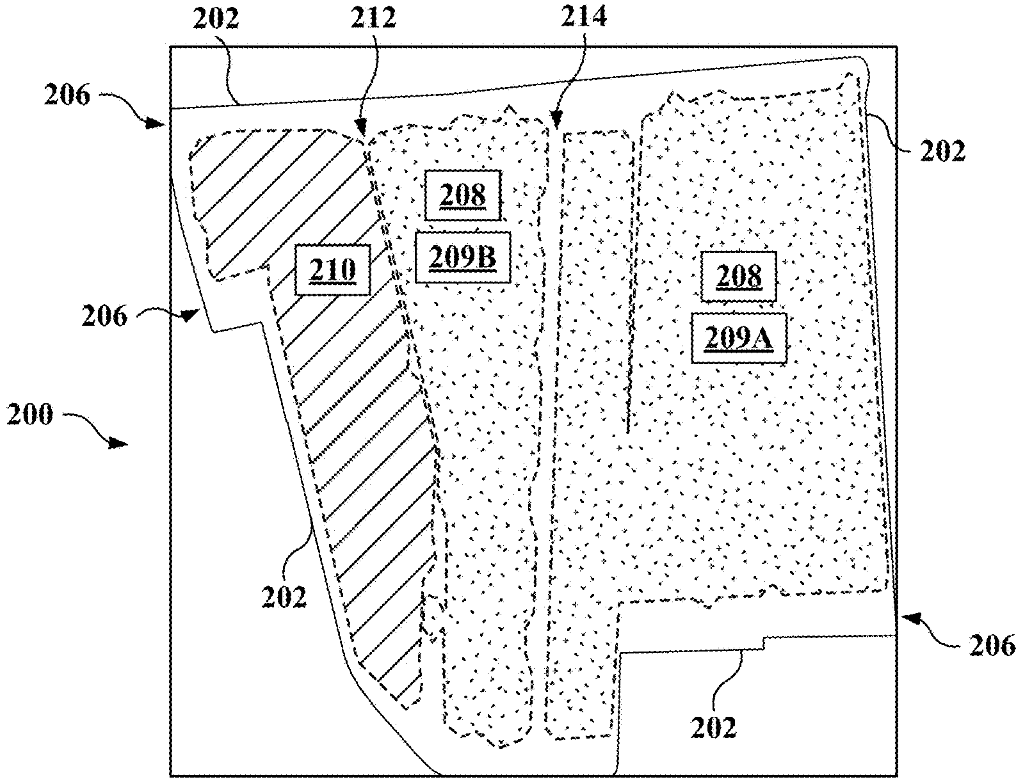
FIG. 2B illustrates guidance zones generated within the field.

FIGS. 2A and 2B illustrate an example of generating guidance zones within a field 200 based on field boundary data and historical machine path data. FIG. 2A illustrates the historical machine path data within the field 200. The field boundary data may include data corresponding to at least one field boundary 202, for example, GPS location data corresponding to the at least one field boundary 202. The field 200 may be enclosed by the at least one field boundary 202, that is, the at least one field boundary 202 may form a perimeter of the field 200. The field boundary 202 may be represented by a polygon. The field boundary 202 may be or include a physical boundary, for example, a river, a lake, a road, a fence, a hill, a tree line, a ditch, a railroad track, or the like. In another example, the field boundary 202 may be or include a designated boundary, for example, a property line, a zoning boundary, a GPS-defined agricultural plot, an administrative boundary used for land management, or the like. The designated boundary may also be based on a physical feature, such as maintaining a set distance from a physical boundary.

The historical machine path data may contain historical data associated with at least one machine and paths traversed by the at least one machine. For example, the historical data associated with a machine may include telemetric data captured by the machine. The historical data associated with the machine may include a machine status, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location). The working status of the machine may be associated with, for example, plowing, tilling, seeding, planting, spraying, harvesting, or the like. The historical data associated with the paths traversed by the machine may include a heading angle of a path, a location of the machine during the path, turns in the path, a time-stamp of the path, a session of the path (e.g., traversed during a first session or a second session), or a machine status during the path.

A machine path, as used herein, refers to a series of sequential position points representing a previous traversal of an agricultural machine through a field. Each position point of a machine path includes location data (e.g., GPS coordinates) and an associated (e.g., corresponding) heading angle indicating the direction of machine travel at that position. The historical machine path data may be segmented into individual machine tracks. A machine path may include (e.g., be segmented into) one or more individual machine tracks. An individual machine track refers to a segmented portion of a machine path between identified turns or operational changes (e.g., a portion of a machine path between two turn-around points at opposite ends of the field 200). Multiple sequential position points of a machine path may be grouped into individual machine tracks based on heading angle changes (e.g., identified turns), time-stamps, operating sessions, or implement status.

The historical machine path data may be depicted by machine paths 204. The machine paths 204 may represent one or more paths that a machine previously traveled within the field 200. The machine paths 204 may include the individual machine tracks within the field 200, for example, a first individual machine track 205A, a second individual machine track 205B, and a third individual machine track 205C. The machine paths 204 may further include tracks within a headland of the field 200, for example, a headland track 205D. The machine paths 204 may be contained within the at least one field boundary 202. The machine paths 204 may indicate position data and heading angle data associated with the machine along the machine paths 204. For example, the machine paths 204 may be generated using position data (e.g., GPS data or the like) and heading angle data captured by the machine while traversing the field 200. A heading angle of a machine path 204 may be measured in, for example, degrees relative to true north, where a heading angle of 0° represents a machine path 204 extending in the true north direction. The machine paths 204 may be directional or non-directional. For example, a heading angle of 0° (true north) and a heading angle of 180° (true south) may be considered to be different heading angles or a same heading angle. The heading angle of a machine path 204 may be an approximate heading angle. For example, the heading angle may be rounded to a nearest whole number (e.g., 0°), tenth (e.g., 0.0°), hundredth (e.g., 0.00°), or the like.

The machine paths 204 may contain curved individual machine tracks. A curved individual machine track may be a path associated with a change in heading angle along a portion of a machine path 204. For example, the curved individual machine track may have a first heading angle for a first portion of the curved individual machine track and a second heading angle for a second portion of the curved individual machine track. The curved individual machine tracks may include a series of heading angles between the first heading angle and the second heading angle captured as the machine traverses a distance between the first heading angle and the second heading angle. For example, the curved individual machine track may include heading angle measurements captured at points along the curved individual machine track, for example, at regular distance intervals (e.g., every meter) or regular time intervals (e.g., every second) as the machine traveled between positions associated with the first heading angle and the second heading angle. In another example, the curved individual machine track may represent a change in heading angle along at least a portion of the machine path 204. A curved individual machine track may be represented by a constant change in heading angle (e.g., a circular or arc path), or may be represented by a non-constant change in heading angle. An individual machine track with little change in heading angle (e.g., a change in heading angle along a portion of the machine path 204 being less than or equal to a threshold value) may be considered a straight individual machine track. The heading angle of a straight individual machine track may be considered a same heading angle along a distance of the straight individual machine track. The heading angle of a straight individual machine track may be determined by calculating a single heading angle to connect two endpoints (e.g., turning points, stopping points) of the straight individual machine track.

The field 200 may contain one or more headlands 206 (e.g., a turnrow, a headland area). A (e.g., each) headland of the headlands 206 may be an area at an end of the field 200. A headland may be used for turning (e.g., turning around a machine pulling an implement) during farming operations (e.g., plowing, planting, harvesting, spraying, or the like). A headland may be characterized by frequent machine movements, for example, turning and overlapping paths. Turning within a headland may reduce or prevent soil compaction and crop damage within other areas of the field 200. A headland may have greater soil compaction than other areas of the field 200. The headlands 206 may be used for planting and subsequently harvested. A headland may have a reduced yield per area compared to other areas of the field 200. A size of a headland may depend on a size of the machine or the implement used during farming operations. For example, a width of a headland may be one, two, three, four, or more times a width of the implement. The headlands 206 may be perpendicular to the lay of an adjacent area of the field 200. For example, a machine path 204 within the headlands 206 (e.g., the headland track 205D) and a machine path 204 within the adjacent area of the field 200 (e.g., the third individual machine track 205C) may extend in intersecting directions. The individual machine tracks may be segmented portions of machine paths 204 between headlands 206 located at opposing ends of the field 200.

The machine paths 204 may form at least one cluster of paths, such as a cluster 207. A cluster of paths may be two or more individual machine tracks associated with a similar heading angle (e.g., parallel). For example, the cluster 207 contains the first individual machine track 205A and the second individual machine track 205B. A similar heading angle may be a heading angle that differs by less than a threshold amount, for example, 0.5°, 1°, 2°, 5°, or the like. A cluster of paths may be two or more individual machine tracks that are spatially adjacent within the field 200. For curved individual machine tracks, a cluster of paths may be two or more curved individual machine tracks associated with a similar change in heading angle. For example, a cluster of paths may be two or more curved individual machine tracks that are equidistant from each other and do not intersect (e.g., parallel curves).

FIG. 2B illustrates guidance zones (e.g., a first guidance zone 208 and a second guidance zone 210) generated within the field 200. The guidance zones may be specific areas within the field 200 that are delineated to guide a machine during farming operations. The guidance zones may be generated based on the at least one cluster of paths (e.g., a cluster of two or more individual machine tracks) and the field boundary data (e.g., the at least one field boundary 202). If no cluster of paths is identified, the guidance zone may default to the entire field 200. The guidance zones may be generated within the at least one field boundary 202. The guidance zones may be generated to include (e.g., encompass or contain) the at least one cluster of paths. The guidance zones may be generated to exclude the headlands 206. The guidance zones may be straight (e.g., including a cluster of straight individual machine tracks) or curved (e.g., including a cluster of curved individual machine tracks). The guidance zones may be represented by guidance zone polygons.

The guidance zones may be separated by one or more split lines. Split lines are boundaries or demarcations identified within the field 200 to separate contiguous or adjacent guidance zones. Split lines may vary in width and length based on factors such as the spatial distribution of guidance zones, machine path density, and/or operational constraints within the field. For example, a first split line 212 may separate the first guidance zone 208 from the second guidance zone 210. Different sections of a same guidance zone may also be separated by a split line. For example, a second split line 214 may separate the first guidance zone 208 into a first section 209A and a second section 209B. The split lines (e.g., the first split line 212 and the second split line 214) may segment the field 200 into operationally distinct regions (e.g., guidance zones or sections of a guidance zone). For example, a region may be the first section 209A or the second section 209B. Each region of the field 200 may be used for a different crop or machine heading direction. The split lines may allow machines to follow optimized paths without overlap and to reduce inefficiencies.

Generating the guidance zones may include creating a raster (e.g., pixel) image. The historical machine path data (e.g., machine paths 204) may include vector values (e.g., location data and heading angle data associated with historical positions of the machine). The vector values may be converted (e.g., rasterized) to a raster image (e.g., FIG. 2A) of the field 200. In some examples, the raster image may be generated, at least in part, using field imagery (e.g., satellite imagery). The field imagery may be used to identify the machine paths 204 within the field 200. Field imagery may be used to identify the machine paths 204 in a field without historical machine path data. The raster image may be used to identify the at least one cluster of paths. For example, an image segmentation model may be applied to the raster image to identify connected regions of similar heading angles. The image segmentation model may partition the raster image into multiple image segments, for example, a first image segment corresponding to a first connected region of similar heading angles, a second image segment corresponding to a second connected region of similar heading angles, and a third image segment corresponding to other areas of the raster image. The image segmentation model may assign a label to each pixel in the raster image such that pixels with a same label share at least one characteristic, for example, heading angle. The image segmentation model may be a computer vision and machine learning (CVML) model and may be used to identify the connected regions by detecting machine paths associated with a similar heading angle within the raster image. The guidance zones may be generated using the raster image. For example, the guidance zones may be generated over (e.g., projected onto) the raster image (e.g., FIG. 2B) of the field 200. Filtered regions may be obtained by filtering the connected regions. For example, the connected regions may be filtered based on size and shape characteristics to exclude (e.g., remove) connected regions that do not meet defined criteria (e.g., a threshold size). The filtered regions may be converted to guidance zone polygons.

Alternatively, the guidance zones may be generated without creating a raster image. The vector values of the historical machine path data may be used to identify the at least one cluster of paths. The historical machine path data may include data points each associated with a timestamp, a speed, a heading angle, and the like. The data points may be clustered to identify the at least one cluster of paths. The clustering may be hierarchical clustering, for example, single-linkage clustering. The data points may be clustered based on, for example, geospatial coordinates (e.g., latitude and longitude), heading angle, or classification as a headland point (e.g., a turning point). The data points may be combined into individual machine tracks before clustering, for example, using timestamps associated with the data points. The individual machine tracks may be clustered based on heading angle in relation to adjacent individual machine tracks, for example, adjacent individual machine tracks with a similar heading angle may be clustered together. The guidance zones may be generated using the at least one cluster of paths. For example, a guidance zone may be generated to include (e.g., encompass or surround) all data points associated with a cluster of paths.

After generating the guidance zones, vector values for the guidance zone may be obtained. The raster image may be used to convert the guidance zones within (e.g., projected onto) the raster image to values that may be used in navigation. For example, the guidance zones may be converted from pixel coordinates to GPS locations, latitude and longitude values, or the like. In another example, the raster image may be converted to a vector image.

Figure 3:
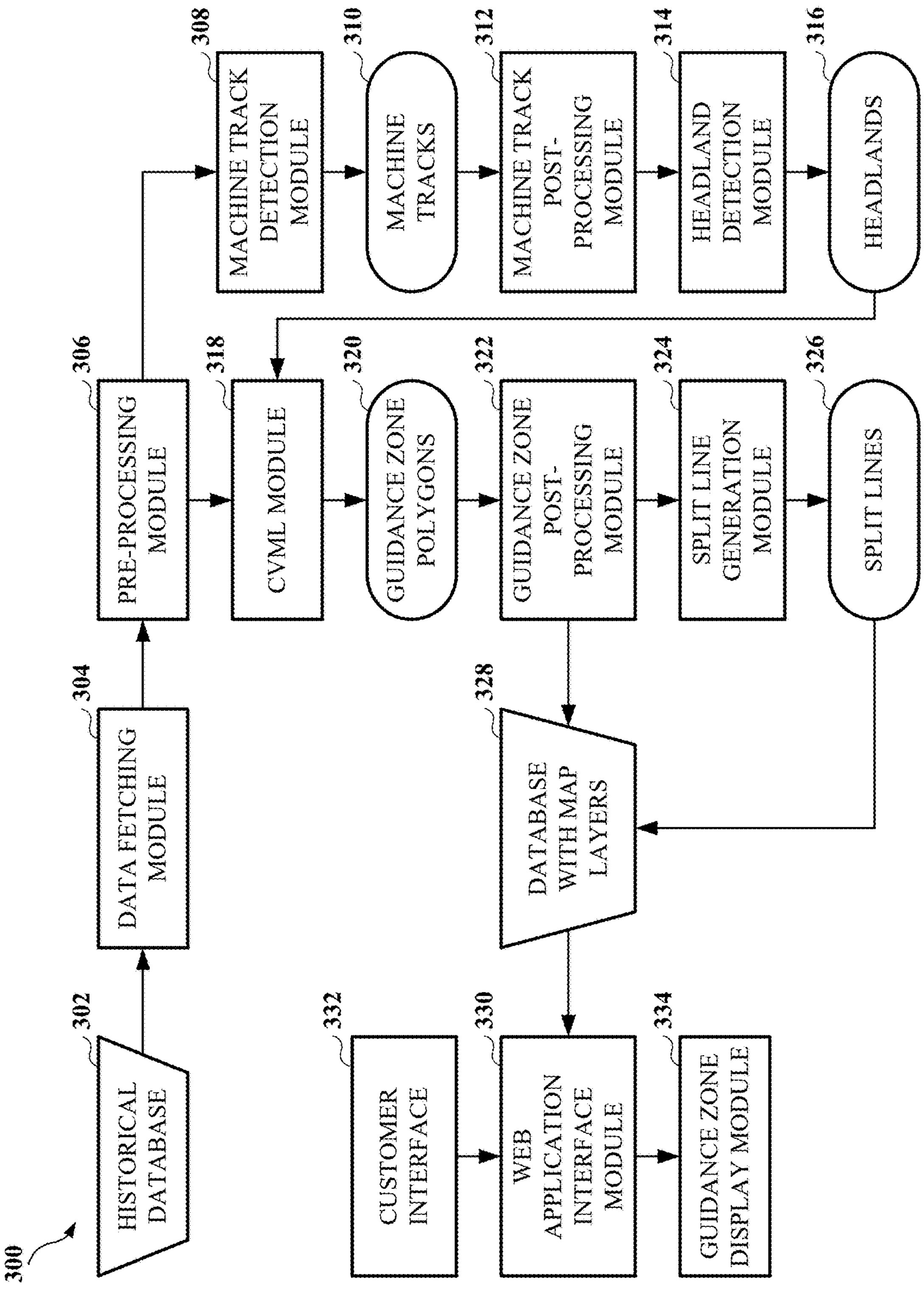
FIG. 3 is a flowchart showing modules, databases, and outputs used to generate and display guidance zones.

FIG. 3 is a flowchart 300 showing modules, databases, and outputs used to generate and display guidance zones. The flowchart 300 can be executed using computing devices, such as the systems, hardware, and software described with respect to FIGS. 1, 2A, and 2B. The flowchart 300 can be performed, for example, by executing a machine-readable program or other computer-executable instructions, such as routines, instructions, programs, or other code. The steps, or operations, of the flowchart 300, or another technique, method, process, or algorithm described in connection with the implementations disclosed herein can be implemented directly in hardware, firmware, software executed by hardware, circuitry, or a combination thereof. For example, the steps or operations described with respect to the flowchart 300 may be stored in one or more non-transitory computer readable media, such as the memory 104 of FIG. 1, as executable instructions that can be executed by one or more processors, such as the processor 102 of FIG. 1.

A historical database 302 may store historical machine data (e.g., the historical machine path data, the historical data associated with the machine, and the historical data associated with the paths traversed by the machine) and agronomic data. The agronomic data may include information about a field (e.g., the field 200) and its agricultural characteristics. For example, the agronomic data may include the field boundary data, soil type, soil nutrient level, soil moisture content, crop history (e.g., previous planting, harvesting, and crop yield information), and the like.

A data fetching module 304 may retrieve data needed for a specific field or set of fields. The data fetching module 304 may retrieve data from the historical database 302.

A pre-processing module 306 may receive data from the data fetching module 304. The pre-processing module 306 may perform pre-processing operations on the data. The pre-processing operations may include, for example, removing inactive, not useful, or nonconforming data. The pre-processing module 306 may remove, from the historical machine path data, machine data (e.g., machine paths 204) based on a machine status, a turning status, a speed of the machine, a working status, an implement status, or a location of the machine. For example, the pre-processing module may remove machine data associated with the machine traversing a road rather than the field. Additionally, the pre-processing operations may include filtering out duplicate or redundant path data, normalizing timestamp data to correct inconsistencies, and aligning position data, for example, to correct for GPS drift. The pre-processing module 306 may also interpolate missing position data for short gaps in machine paths and remove erroneous outliers caused by temporary signal loss or sensor malfunctions. The pre-processing module 306 may produce pre-processed data.

A machine track detection module 308 may identify individual machine tracks based on the pre-processed data. The individual machine tracks may include machine tracks within the field (e.g., individual machine tracks of the machine paths 204 within the field 200) and machine tracks within a headland (e.g., the headlands 206). The machine track detection module 308 may produce machine tracks data 310.

A machine track post-processing module 312 may receive the machine tracks data 310. The machine track post-processing module 312 may classify (e.g., label) individual machine tracks as straight individual machine tracks, curved individual machine tracks, or turns. The machine track post-processing module 312 may associate individual machine tracks in the machine tracks data 310 with a heading angle (e.g., label individual machine tracks as an individual machine track with a heading angle of, for example, 0°).

A headland detection module 314 may detect headlands based on the individual machine tracks. The headlands may be detected based on turns in the individual machine tracks, overlap in the individual machine tracks, proximity to a field boundary, or the like. For example, a headland may be detected based on a machine turning around (e.g., a 180° turn). The headland detection module 314 may include a supervised machine learning model to classify headlands. For example, the supervised machine learning model may be trained using training data that is labeled (e.g., manually) with headlands. After training and using the supervised machine learning model, the supervised machine learning model may be further trained (e.g., retrained) using updated training data. In another example, the headland detection module 314 may include a geospatial index (e.g., gridding) to detect the headlands. The geospatial index may categorize areas of the field based on, for example, a number of turns within a defined shape. An area with a higher number of turns may be identified as a headland. The headland detection module 314 may produce headlands data 316 (e.g., data indicating locations of the headlands).

A machine learning (ML) module 318 may receive the pre-processed data from the pre-processing module 306 and the headlands data 316 from the headland detection module 314. The ML module 318 may use (e.g., produce, create, or receive) a rasterized (e.g., pixel) image of the individual machine tracks. The rasterized image may exclude the headlands data 316. The rasterized image may depict individual machine paths based on their associated heading angle. For example, the rasterized image may represent individual machine paths using different attributes, such as a first visual attribute (e.g., color, pattern, or shading) associated with a first heading angle and a second visual attribute associated with a second heading angle. The ML module 318 may use computer vision on the rasterized image. The ML module 318 may detect clusters of individual machine tracks with a similar heading angle within the rasterized image. For example, the ML module 318 may detect a cluster of individual machine tracks of a same visual attribute. The clusters of individual machine tracks may be detected using image segmentation techniques. The ML may produce guidance zone polygons data 320. The guidance zone polygons data 320 may include the cluster of individual machine tracks and exclude the headlands data 316.

In another example, the ML module 318 may detect clusters of individual machine tracks with a similar heading angle within the pre-processed data. The ML module 318 may perform clustering on data points within the pre-processed data. The data points may be vector data points including, for example, timestamp data, velocity data, location data, or heading angle data associated with historical positions of the machine. The clustering may be hierarchical clustering, for example, single-linkage clustering. The data points may be clustered based on, for example, geospatial coordinates (e.g., latitude and longitude), heading angle, or classification as a headland point (e.g., a turning point). The data points may be combined into individual machine tracks before clustering, for example, using timestamps associated with the data points. The individual machine tracks may be clustered based on heading angle in relation to adjacent individual machine tracks, for example, adjacent individual machine tracks with a similar heading angle may be clustered together.

A guidance zone post-processing module 322 may extract the guidance zone polygons data 320, convert the guidance zone polygons data 320 from raster (e.g., pixel) format to vector format, and post-process the guidance zone polygons data 320 using buffering and smoothing algorithms. The vector format may be latitude and longitude coordinates. The guidance zone post-processing module 322 may also merge similar guidance zone polygons, resolve overlaps between guidance zone polygons, or evaluate the quality of guidance zone polygons. For example, if two adjacent guidance zone polygons are each associated with a similar heading angle, the two adjacent guidance zone polygons may be combined into a single guidance zone polygon. In another example, if two adjacent guidance zone polygons overlap, one or both guidance zone polygons may be modified to reduce or remove the overlap. The quality of the guidance zone polygons may be evaluated based on size, appearance, inconsistencies (e.g., rough edges or protrusions). A guidance zone polygon may be adjusted based on the quality of the guidance zone polygon (e.g., if the quality is below a threshold value). The guidance zone polygon may be adjusted to be combined with another guidance zone polygon, to be reduced in size, to be removed, or the like, or may be adjusted using the buffering and smoothing algorithms.

The buffering and smoothing algorithms may be used to adjust the boundaries of the guidance zone polygons data 320. The buffering and smoothing algorithms may remove inconsistencies (e.g., rough edges or protrusions) in the boundaries of the guidance zone polygons data 320. For example, protrusions into or out of the boundaries of the guidance zone polygons data 320 that are smaller than a threshold size may be removed by the buffering and smoothing algorithms. The buffering and smoothing algorithms may start with a boundary of a guidance zone polygon including a cluster of individual machine tracks. The boundary may be expanded by a set amount, contracted by a set amount, and expanded back to the original size. Expanding the boundary may smooth rough edges of the boundary, for example, rough edges generated from the raster image. Contracting the boundary may remove protrusions in the boundary. In an example, the boundary may be expanded by one meter, contracted by two meters, and expanded by one meter back to the original size.

A split line generation module 324 may generate (e.g., identify, define, etc.) split lines data 326 to delineate boundaries between contiguous or adjacent guidance zones. A split line may separate two guidance zones with a same heading angle, or two guidance zones associated with different heading angles.

A database with map layers 328 may store guidance zone artifacts, including the post-processed guidance zone polygons data 320 and the split lines data 326. The database with map layers 328 may also store guidance zone artifacts generated by other modules, such as the machine tracks data 310, the headlands data 316, the guidance zone polygons data 320, or other artifacts.

A web application interface module 330 may retrieve data from the database with map layers 328 based on input from a customer interface 332. The customer interface 332 may be, for example, a website or another interactive platform that enables a client device, such as the computing device 100 of FIG. 1, to access and interact with the stored data. The customer interface 332 enables a customer (e.g., a user) to request various guidance zone artifacts.

The web application interface module 330 connects the customer interface 332 with the database with map layers 328. The web application interface module 330 may receive the customer's request for data (e.g., guidance zone artifacts), retrieve the data from the database with map layers 328, and send the data to a guidance zone display module 334. The web application interface module 330 may provide a recommendation to the client device based on the data generated by the modules. For example, the web application interface module 330 may suggest that a guidance zone is used for a particular crop, farmed along particular paths, or the like. The web application interface module 330 may receive a response to the recommendation from the client device through the customer interface 332. In an example, if the client device affirms the recommendation, the web application interface module may pre-populate path planning parameters (e.g., planned paths within the field that may be followed by a machine, for example, autonomously).

The guidance zone display module 334 may display the requested data to the customer. For example, the guidance zone display module 334 may display the guidance zone within the customer interface 332. The guidance zone display module 334 may utilize a display (e.g., a monitor) connected to the client device.

Each of the historical database 302 and the database with map layers 328 may be stored in one or more memories, for example, the memory 104. Each of the data fetching module 304, the pre-processing module 306, the machine track detection module 308, the machine track post-processing module 312, the headland detection module 314, the ML module 318, the guidance zone post-processing module 322, the split line generation module 324, the web application interface module 330, the customer interface 332, and the guidance zone display module 334 may be implemented by one or more processors, for example, the processor 102. Some or all of the modules, databases, and outputs in the flowchart 300 may be located or performed at the server side, at the client side, or at a combination of the server side and the client side.

Figure 4:
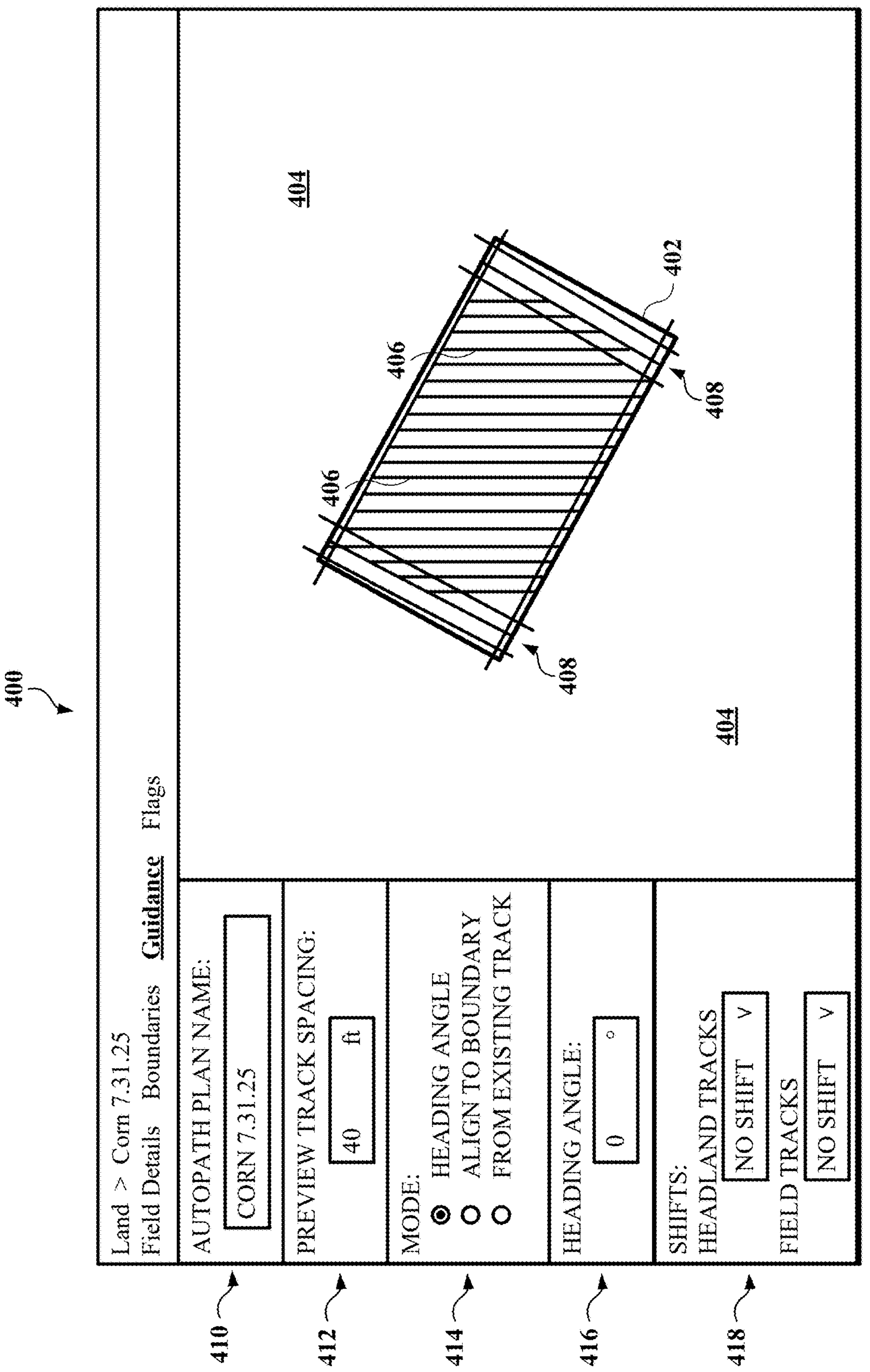
FIG. 4 illustrates an example of a user interface for displaying a guidance zone.

FIG. 4 illustrates an example of a user interface 400 for displaying a guidance zone 402. For example, the user interface 400 may be displayed by the guidance zone display module 334. A user may interact with the user interface to modify the guidance zone 402. The guidance zone 402 may be a recommendation of a guidance zone provided by the user interface 400. The user interface 400 may include an option for the user to request a recommendation of a guidance zone. The user interface 400 may display more than one guidance zone, for example, the first guidance zone 208 and the second guidance zone 210 of FIG. 2B.

The guidance zone 402 may be shown within a map 404. For example, the map 404 may be or include areas surrounding a field containing the guidance zone 402, or the map 404 may be or include other areas of the field not contained within the guidance zone 402. The guidance zone 402 may contain machine paths 406 that may be used as a planned path (e.g., a guidance plan including tracks that may be followed by a machine, for example, autonomously). The machine paths 406 may represent a single path that the machine may navigate in a session. The guidance zone 402 may contain headlands 408. In some implementations, the guidance zone 402 may exclude the headlands 408.

The user interface 400 may include a name configuration setting 410, a track spacing setting 412, a mode setting 414, a heading angle setting 416, and a shift setting 418 that enable a user to customize the guidance zone 402 within the user interface 400. That is, the user may input data into the name configuration setting 410, the track spacing setting 412, the mode setting 414, the heading angle setting 416, and the shift setting 418. The data input by the user may be used to modify the guidance zone 402. Modifications to the guidance zone 402 may be displayed (e.g., as a preview showing how the guidance zone 402 may look based on the data) by the user interface 400. The user interface 400 may also include settings related to the headlands 408, for example, an offset for the headlands 408 measured as a distance.

The name configuration setting 410 enables the user to name the planned path. The name configuration setting 410 may pre-populate a name for the planned path based on, for example, a crop and a date. The crop may be selected by the user or suggested by the user interface 400. The date may be pre-populated based on, for example, a current date (e.g., today's date). The name for the planned path may be used for later retrieval of the planned path, for example, when generating a related planned path in a subsequent year (e.g., a planned path for corn in 2026 may be based on a planned path for corn in 2025).

The track spacing setting 412 enables the user to adjust a distance between individual machine tracks of the machine paths 406 within the guidance zone 402. The track spacing setting 412 may pre-populate the distance between the individual machine tracks of the machine paths 406 based on, for example, historical machine paths within the field. The user may adjust the distance between the individual machine tracks of the machine paths 406. The user may adjust the distance between the individual machine tracks based on, for example, a width of a farming implement (e.g., a number of rows of crops that a farming implement can facilitate in one pass). Adjusting the distance between the individual machine tracks may update the user interface 400 to display individual machine tracks spaced by the updated distance.

The mode setting 414 allows the user to select a mode of determining a direction of the machine paths 406. The modes may each specify a different way for the user interface 400 to generate the machine paths 406. For example, the modes may include a heading-angle mode, an align-to-boundary mode, and a from-existing-track mode. The mode setting 414 may have a mode selected by default, for example, the heading-angle mode. Selecting the heading-angle mode enables the user to input a heading angle for the individual machine tracks of the machine paths 406, for example, by causing the user interface 400 to display the heading angle setting 416. Selecting the align-to-boundary mode enables the user to input additional parameters regarding a boundary to align (e.g., determine a direction using) the individual machine tracks of the machine paths 406 with. Selecting the from-existing-track mode enables the user to select an existing track to use as the machine paths 406. For example, historical machine paths captured by a machine traversing the area including the guidance zone 402 in the past may be stored and used as the machine paths 406. In another example, machine paths associated with a guidance zone generated in the past may be retrieved and used as the machine paths 406 for the guidance zone 402.

The heading angle setting 416 enables the user to set the direction of the individual machine tracks of the machine paths 406. For example, the user may input a heading angle to use as the heading angle for the individual machine tracks. For example, a heading angle of 0° represents a machine path 204 extending in the true north direction. The user may adjust the heading angle within the heading angle setting 416. The user may adjust the heading angle to farm the field in a different direction. For example, a user may desire to plant crops in rows extending perpendicular (e.g., in intersecting directions) to rows used in the past to better utilize space or reduce soil compaction. Adjusting the heading angle within the heading angle setting 416 may update the user interface 400 to display individual machine tracks extending in a direction of the updated heading angle.

The shift setting 418 enables the user to select shifts for the machine paths 406, for example, within the headlands 408 and within the field (e.g., the individual machine tracks). The shift setting 418 may include a drop-down selector for the user to select from a predetermined list of shifts. The shift setting 418 may default to a no-shift setting. The shifts may represent a distance to shift the machine paths 406. Selecting a shift may cause the machine paths 406 associated with a specific area (e.g., the headlands 408 or within the field) to shift by the selected distance (e.g., a desired amount), for example, to reduce impact on the field by traversing the same paths as previous operations. Selecting a shift may ensure the machine traverses specific paths desired by the user. The shifts may be associated with a direction. For example, the user may select a shift for the field tracks corresponding to 15 inches to the east. In another example, the user may select a shift for the headland tracks corresponding to 6 inches inward. Selecting a shift within the shift setting 418 may update the user interface 400 to display machine paths 406 shifted by the selected distance.

Figure 5:
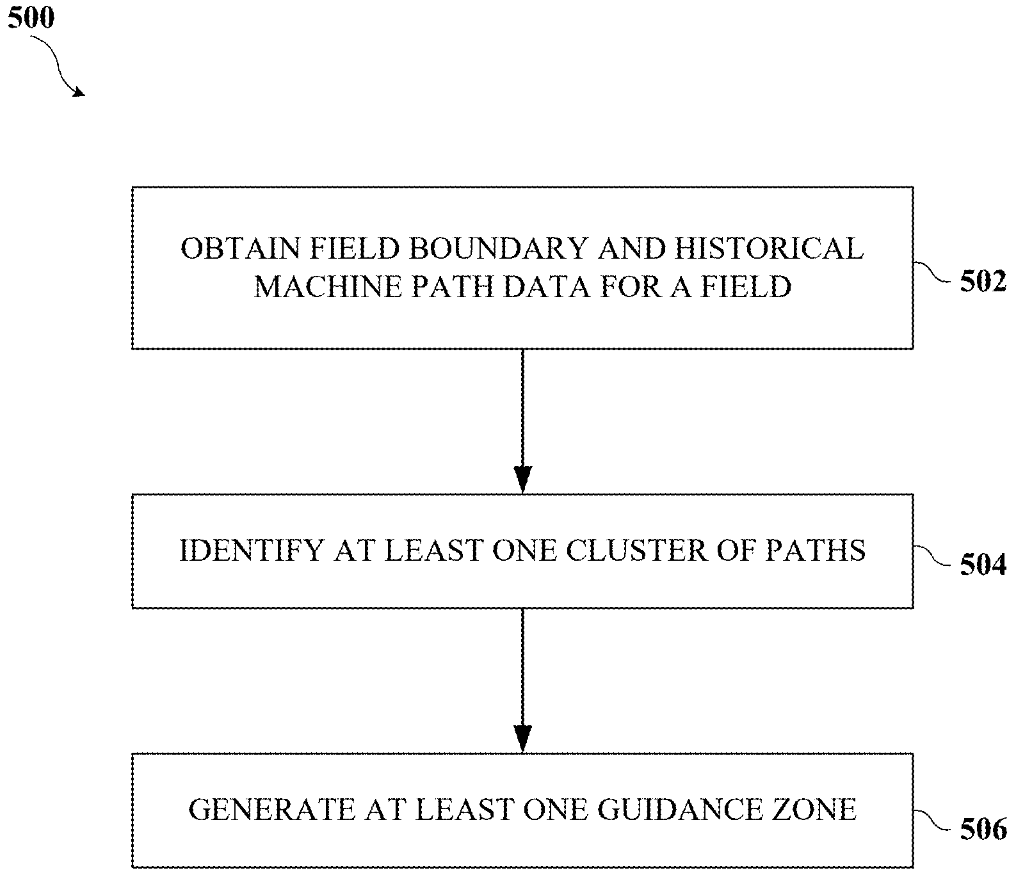
FIG. 5 is a flowchart of an example of a first technique for generating a guidance zone.

FIG. 5 is a flowchart of an example of a first technique 500 for generating a guidance zone. The first technique 500 can be executed using computing devices, such as the systems, hardware, and software described with respect to FIGS. 1-4. The first technique 500 can be performed, for example, by executing a machine-readable program or other computer-executable instructions, such as routines, instructions, programs, or other code. The steps, or operations, of the first technique 500, or another technique, method, process, or algorithm described in connection with the implementations disclosed herein can be implemented directly in hardware, firmware, software executed by hardware, circuitry, or a combination thereof.

At 502, field boundary data and historical machine path data for a field are obtained. The field boundary data and historical machine path data may be obtained from a database, for example, the historical database 302 of FIG. 3. The field boundary data may include data corresponding to at least one field boundary (e.g., the field boundary 202 of FIG. 2A), for example, GPS location data corresponding to the at least one field boundary.

The historical machine path data may contain historical data associated with the machine and paths traversed by the machine. For example, the historical data associated with the machine may include telemetric data captured by the machine. The historical data associated with the machine may include a machine status, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location).

The historical data associated with the paths traversed by the machine may include a heading angle of a path, a location of the machine during the path, turns in the path, a timestamp of the path, a session of the path (e.g., traversed during a first session or a second session), or a machine status during the path. The historical machine path data may include a plurality of machine paths. Each machine path of the plurality of machine paths may include position data and associated heading angle data for that path. The historical machine path data may be segmented into individual machine tracks. An individual machine track refers to a segmented portion of a machine path between identified turns or operational changes (e.g., a portion of a machine path between two turn-around points at opposite ends of the field). Multiple sequential position points of a machine path may be grouped into individual machine tracks based on heading angle changes (e.g., identified turns), timestamps, operating sessions, or implement status.

At 504, at least one cluster of paths is identified. The cluster of paths may be individual machine tracks associated with a similar heading angle (e.g., parallel). Two heading angles may be considered similar if they differ by less than a threshold amount (e.g., number of degrees), for example, 0.5°, 1°, 2°, 5°, or the like. The cluster of paths may be two or more individual machine tracks that are spatially adjacent within the field. Identifying the at least one cluster of paths may include identifying a cluster of curved individual machine tracks. For curved individual machine tracks, the cluster of paths may be two or more curved individual machine tracks associated with a similar change in heading angle. For example, the cluster of paths may be two or more curved individual machine tracks that are equidistant from each other and do not intersect (e.g., parallel curves).

At 506, at least one guidance zone is generated. The at least one guidance zone may be generated based on the at least one cluster of paths and the field boundary data. The at least one guidance zone may include (e.g., encompass, contain) the at least one cluster of paths (e.g., the individual machine tracks of the at least one cluster of paths). The at least one guidance zone may be generated within the field boundaries. The at least one guidance zone may be displayed at a client device.

The first technique 500 may further include generating vector values of the at least one guidance zone. Identifying the at least one cluster of paths at 504 may include creating a raster image of the field, assigning at least one visual attribute to pixels of the raster image, and identifying the at least one cluster of paths by applying an image segmentation model to the raster image. Identifying the at least one cluster of paths at 504 may further include using a CVML model to detect individual machine tracks associated with a similar heading angle. The raster image may be created by projecting the plurality of machine paths onto an image of the field. The at least one visual attribute assigned to pixels of the raster image may be based on, for example, a heading angle associated with the plurality of machine paths at the pixels, a feature derived using the heading angle, or other properties of the individual machine track. Alternatively, identifying the at least one cluster of paths at 504 may include clustering data points within the historical machine path data to cluster individual machine tracks associated with a similar heading angle. Generating the at least one guidance zone at 506 may include filtering the at least one cluster of paths to obtain at least one filtered region and converting the at least one filtered region into the at least one guidance zone. The at least one cluster of paths may be filtered based on size and shape characteristics. The vector values of the at least one guidance zone may be generated by projecting the guidance zone onto an image of the field (e.g., the raster image) and converting the guidance zone to, for example, latitude and longitude values.

The first technique 500 may further include identifying at least one headland of the field. The at least one headland may be identified before generating the at least one guidance zone. The at least one headland may be identified based on the machine paths. For example, identifying the at least one headland of the field may include identifying changes in heading angle of the machine paths near the field boundary and identifying overlapping portions of machine paths near the field boundaries. The at least one headland may be identified using a supervised machine learning model. Generating the at least one headland may be based on changes in the heading angle and the overlapping machine paths. The at least one headland may be displayed at a client device. Generating the at least one guidance zone at 506 may include generating the at least one guidance zone to exclude the at least one headland.

The first technique 500 may further include identifying one or more split lines. Split lines are boundaries or demarcations generated within the field to separate contiguous or adjacent guidance zones. Split lines may vary in width and length based on factors such as the spatial distribution of guidance zones, machine path density, and/or operational constraints within the field. For example, a split line may be displayed at a client device separating a first guidance zone from a second guidance zone. A split line may be identified to separate a guidance zone from the at least one guidance zone. Generating the at least one guidance zone at 506 may include generating two or more guidance zones separated by split lines.

The first technique 500 may further include processing the historical machine path data to remove nonconforming machine paths. Processing the historical machine path data may be performed before identifying the at least one cluster of paths at 504. Processing the historical machine path data may include identifying and filtering machine status data, normalizing heading angle data across the machine paths (e.g., the individual machine tracks), and removing nonconforming data points. The nonconforming data points may be machine paths (e.g., individual machine tracks) associated with values of the machine status data. For example, the nonconforming data points may be machine paths associated with machine idle states (e.g., a moving status of not moving) or implement inactive states (e.g., an implement status of inactive or not in use).

The first technique 500 may further include segmenting the machine paths into individual machine tracks. The machine paths may be segmented into individual machine tracks by examining the historical machine path data. For example, the machine paths may be segmented into individual machine tracks by examining at least one of turns, timestamps, sessions, or machine status. In another example, the machine paths may be segmented into individual machine tracks by analyzing sequential position data points to identify turns based on, for example, heading angle changes, grouping position data points between identified turns into individual machine tracks, classifying the individual machine tracks, and filtering the individual machine tracks. The individual machine tracks may be classified based on, for example, heading angle variation. The individual machine tracks may be classified as, for example, straight individual machine tracks or curved individual machine tracks. Filtering the individual machine tracks may include filtering based on, for example, at least one of timestamps, sessions, or machine status.

The first technique 500 may further include generating a planned path (e.g., an autonomous path plan or a guidance plan) for a machine to traverse the field. A planned path may be a pre-defined route or set of guidance lines that directs the movements of farming equipment across the field. A planned path ensures that various agricultural operations, such as planting, fertilizing, spraying, and harvesting, may be carried out in an organized and efficient manner. The planned path may be generated based on the at least one guidance zone, for example, the planned path may be within (e.g., contained by, encompassed by) a guidance zone. The machine may be configured to traverse (e.g., follow, maintain position along) the planned path through the field. The machine may traverse the planned path autonomously, for example, using an autonomous guidance system. Alternatively, the planned path may be followed manually, for example, by a user operating the machine.

Figure 6:
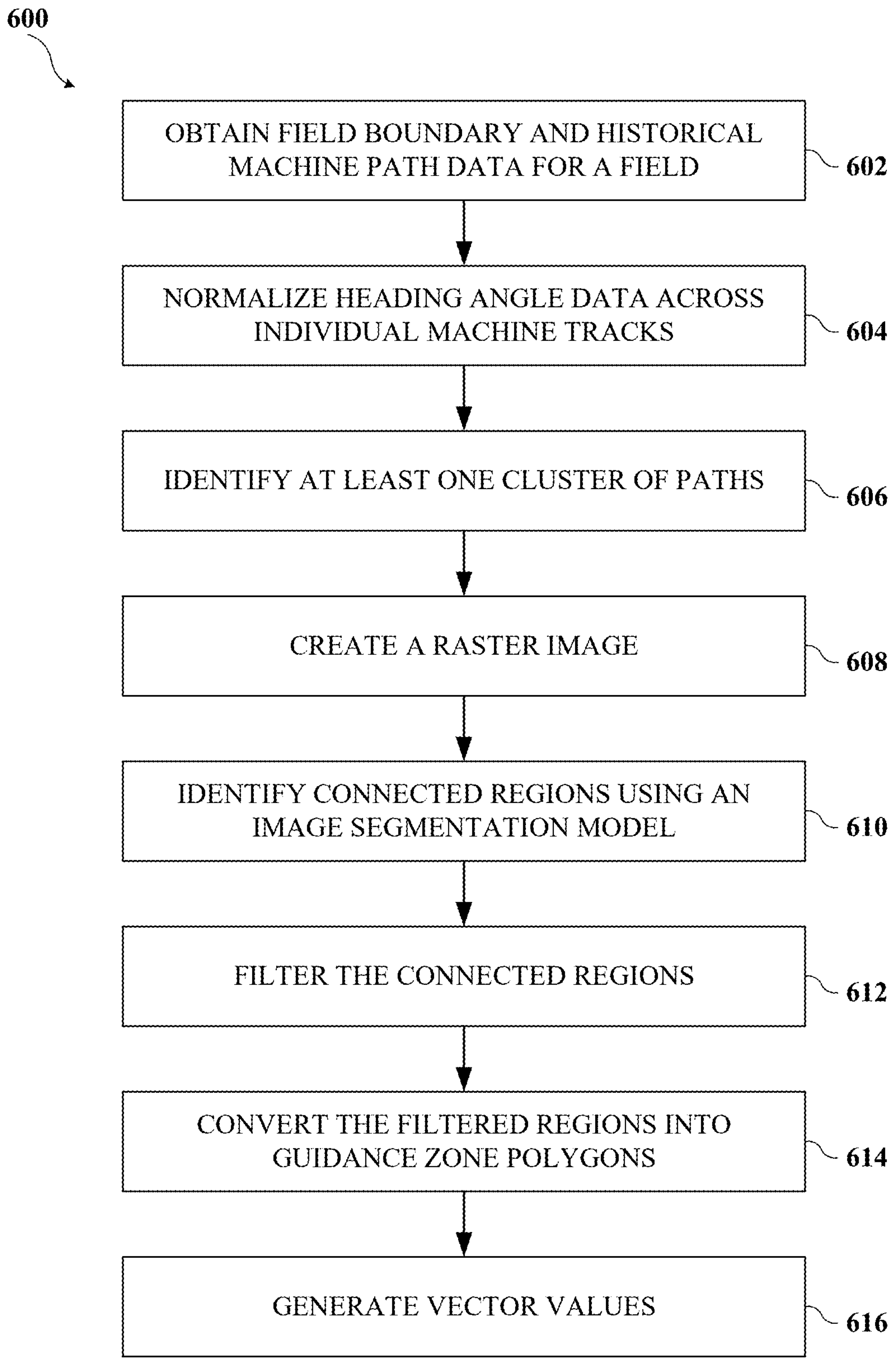
FIG. 6 is a flowchart of an example of a second technique for generating a guidance zone.

FIG. 6 is a flowchart of an example of a second technique 600 for generating a guidance zone. The second technique 600 can be executed using computing devices, such as the systems, hardware, and software described with respect to FIGS. 1-4. The second technique 600 can be performed, for example, by executing a machine-readable program or other computer-executable instructions, such as routines, instructions, programs, or other code. The steps, or operations, of the second technique 600, or another technique, method, process, or algorithm described in connection with the implementations disclosed herein can be implemented directly in hardware, firmware, software executed by hardware, circuitry, or a combination thereof.

At 602, field boundary data and historical machine path data for a field are obtained. The field boundary data and historical machine path data may be obtained from a database, for example, the historical database 302 of FIG. 3.

The historical machine path data may contain historical data associated with the machine and paths traversed by the machine. For example, the historical data associated with the machine may include telemetric data captured by the machine. The historical data associated with the machine may include a machine status, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location).

The historical data associated with the paths traversed by the machine may include a heading angle of a path, a location of the machine during the path, turns in the path, a timestamp of the path, a session of the path (e.g., traversed during a first session or a second session), or a machine status during the path. The historical machine path data may include a plurality of machine paths. Each machine path of the plurality of machine paths may include position data and associated heading angle data for that path. The historical machine path data may be segmented into individual machine tracks. An individual machine track refers to a segmented portion of a machine path between identified turns or operational changes (e.g., a portion of a machine path between two turn-around points at opposite ends of the field). Multiple sequential position points of a machine path may be grouped into individual machine tracks based on heading angle changes (e.g., identified turns), timestamps, operating sessions, or implement status.

At 604, heading angle data is normalized across individual machine tracks. The heading angle may be rounded to a nearest whole number (e.g., 0°), tenth (e.g., 0.0°), hundredth (e.g., 0.00°), or the like. The heading angle data may be normalized such that it is non-directional. For example, a heading angle of 0° (true north) and a heading angle of 180° (true south) may be normalized such that they are considered a same heading angle. The heading angle data may be normalized into representative heading angles. For example, each individual machine track may be assigned a representative heading angle based on the heading angle of the individual machine track, for example, based on the heading angle being different from the representative heading angle by less than a threshold amount. In another example, normalizing the heading angle data may include assigning a representative heading angle to an entire machine path.

The machine paths may contain curved individual machine tracks. A curved individual machine track may be a path associated with a change in heading angle along a portion of a machine path. For example, the curved individual machine track may have a first heading angle for a first portion of the curved individual machine track and a second heading angle for a second portion of the curved individual machine track. Normalizing the heading angle data for curved individual machine tracks may include normalizing the curved individual machine tracks into representative changes in heading angles. For example, each curved individual machine track may be assigned a representative change in heading angle based on the change in heading angle along the individual machine track or by the first heading angle and the second heading angle.

At 606, at least one cluster of paths is identified. The cluster of paths may be individual machine tracks associated with a similar heading angle (e.g., parallel). Two heading angles may be considered similar if they differ by less than a threshold amount (e.g., number of degrees), for example, 0.5°, 1°, 2°, 5°, or the like. The cluster of paths may be two or more individual machine tracks that are spatially adjacent within the field. Identifying the at least one cluster of paths may include identifying a cluster of curved individual machine tracks. For curved individual machine tracks, the cluster of paths may be two or more curved individual machine tracks associated with a similar change in heading angle. For example, the cluster of paths may be two or more curved individual machine tracks that are equidistant from each other and do not intersect (e.g., parallel curves).

At 608, a raster (e.g., pixel) image is created. The historical machine path data (e.g., machine paths) may include vector data (e.g., location data and heading angle data associated with historical positions of the machine). The vector data may be converted (e.g., rasterized) to a raster image of the field. The raster image may depict individual machine paths based on their associated heading angle. The raster image may be created by projecting the machine paths onto an image of the field and assigning at least one visual attribute to pixels of the image based on, for example, a heading angle (e.g., the heading angle associated with an individual machine track located at that pixel), a feature derived using the heading angle, or other properties of the individual machine track. For example, the raster image may represent individual machine paths using different attributes, such as a first visual attribute (e.g., color, pattern, or shading) associated with a first heading angle and a second visual attribute associated with a second heading angle. The raster image may be used to identify the at least one cluster of paths, for example, using image segmentation techniques. Identifying the at least one cluster of paths may include identifying more than one cluster of paths. In an example, at least two clusters of paths are identified, a first cluster of paths associated with a first visual attribute and a second cluster of paths associated with a second visual attribute.

At 610, connected regions are identified using an image segmentation model. An image segmentation model may be applied to the raster image to identify connected regions of similar heading angles. Identifying the connected regions of similar heading angles may include identifying the first cluster of paths based on the first visual attribute and the second cluster of paths based on the second visual attribute.

A computer vision and machine learning (CVML) model may be used to identify the connected regions by detecting individual machine tracks associated with a similar heading angle within the raster image. The CVML model may detect clusters of individual machine tracks with a similar heading angle within the rasterized image. For example, the CVML model may detect a cluster of individual machine tracks associated with a same visual attribute, for example, a same color.

At 612, the connected regions are filtered. Filtering the connected regions may produce filtered regions. The connected regions may be filtered based on, for example, size and shape characteristics. For example, the connected regions may be filtered to exclude (e.g., remove) connected regions that do not meet defined criteria (e.g., a threshold size).

At 614, the filtered regions are converted into guidance zone polygons. Converting the filtered regions into guidance zone polygons may include generating a first guidance zone polygon including the first cluster of paths (e.g., the first cluster of paths based on the first visual attribute) and a second guidance zone polygon including the second cluster of paths (e.g., the second cluster of paths based on the second visual attribute).

At 616, vector values are generated. The vector values may be generated by projecting the guidance zone polygons onto an image (e.g., a raster image) of the field and converting the guidance zone polygons to vector values based on alignment within the image. Generating the vector values may convert the guidance zone polygons within the raster image to values that may be used in navigation. For example, the guidance zone polygons may be converted from pixel coordinates to GPS locations, latitude and longitude values, or the like.

The second technique 600 may further include identifying at least one headland of the field. The at least one headland may be identified before converting the filtered regions into guidance zone polygons. The at least one headland may be identified based on the machine paths. For example, identifying the at least one headland of the field may include identifying changes in heading angle of the machine paths near the field boundaries and identifying overlapping portions of machine paths near the field boundaries. The at least one headland may be identified using a supervised machine learning model. Generating the at least one headland may be based on changes in the heading angle and the overlapping machine paths. The at least one headland may be displayed at a client device. Converting the filtered regions into guidance zone polygons at 614 may include generating the guidance zone polygons to exclude the at least one headland.

The second technique 600 may further include identifying one or more split lines. Split lines are boundaries or demarcations generated within the field to separate contiguous or adjacent guidance zone polygons. Split lines may vary in width and length based on factors such as the spatial distribution of guidance zones, machine path density, and/or operational constraints within the field. For example, a split line may be displayed at a client device separating a first guidance zone polygon from a second guidance zone polygon. Converting the filtered regions into guidance zone polygons at 614 may include generating two or more guidance zone polygons separated by split lines.

The second technique 600 may further include processing the historical machine path data to remove nonconforming machine paths. Processing the historical machine path data may be performed before identifying the at least one cluster of paths at 606. Processing the historical machine path data may include identifying and filtering machine status data, normalizing heading angle data across the machine paths, and removing nonconforming data points. The nonconforming data points may be machine paths associated with values of the machine status data. For example, the nonconforming data points may be machine paths associated with machine idle states (e.g., a moving status of not moving) or implement inactive states (e.g., an implement status of inactive or not in use).

The second technique 600 may further include segmenting the machine paths into individual machine tracks. The machine paths may be segmented into individual machine tracks by examining the historical machine path data. For example, the machine paths may be segmented into individual machine tracks by examining at least one of turns, timestamps, sessions, or machine status. In another example, the machine paths may be segmented into individual machine tracks by analyzing sequential position data points to identify turns based on, for example, heading angle changes, grouping position data points between identified turns into individual machine tracks, classifying the individual machine tracks, and filtering the individual machine tracks. The individual machine tracks may be classified based on, for example, heading angle variation. The individual machine tracks may be classified as, for example, straight individual machine tracks or curved individual machine tracks. Filtering the individual machine tracks may include filtering based on, for example, at least one of timestamps, sessions, or machine status.

The second technique 600 may further include generating a planned path (e.g., an autonomous path plan or a guidance plan) for a machine to traverse the field. A planned path may be a pre-defined route or set of guidance lines that directs the movements of farming equipment across the field. A planned path ensures that various agricultural operations, such as planting, fertilizing, spraying, and harvesting, may be carried out in an organized and efficient manner. The planned path may be generated based on a guidance zone polygon, for example, the planned path may be within (e.g., contained by, encompassed by) the guidance zone polygon. The machine may be configured to traverse (e.g., follow, maintain position along) the planned path through the field. The machine may traverse the planned path autonomously, for example, using an autonomous guidance system.

Figure 7:
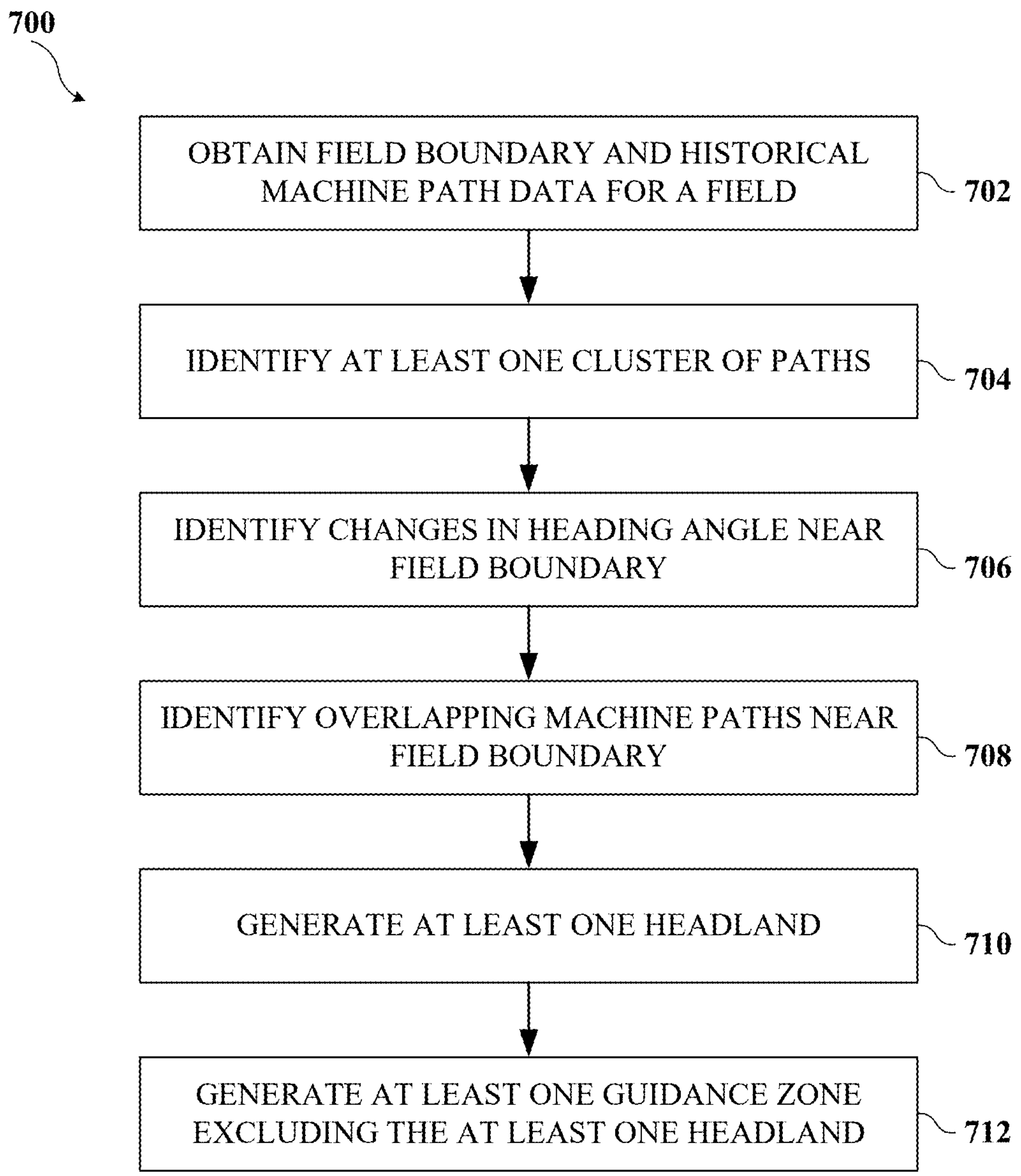
FIG. 7 is a flowchart of an example of a third technique for generating a guidance zone.

FIG. 7 is a flowchart of an example of a third technique 700 for generating a guidance zone. The third technique 700 can be executed using computing devices, such as the systems, hardware, and software described with respect to FIGS. 1-4. The third technique 700 can be performed, for example, by executing a machine-readable program or other computer-executable instructions, such as routines, instructions, programs, or other code. The steps, or operations, of the third technique 700, or another technique, method, process, or algorithm described in connection with the implementations disclosed herein can be implemented directly in hardware, firmware, software executed by hardware, circuitry, or a combination thereof.

At 702, field boundary data and historical machine path data for a field are obtained. The field boundary data and historical machine path data may be obtained from a database, for example, the historical database 302 of FIG. 3.

The historical machine path data may contain historical data associated with the machine and paths traversed by the machine. For example, the historical data associated with the machine may include telemetric data captured by the machine. The historical data associated with the machine may include a machine status, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location).

The historical data associated with the paths traversed by the machine may include a heading angle of a path, a location of the machine during the path, turns in the path, a timestamp of the path, a session of the path (e.g., traversed during a first session or a second session), or a machine status during the path. The historical machine path data may include a plurality of machine paths. Each machine path of the plurality of machine paths may include position data and associated heading angle data for that path. The historical machine path data may be segmented into individual machine tracks. An individual machine track refers to a segmented portion of a machine path between identified turns or operational changes (e.g., a portion of a machine path between two turn-around points at opposite ends of the field). Multiple sequential position points of a machine path may be grouped into individual machine tracks based on heading angle changes (e.g., identified turns), timestamps, operating sessions, or implement status.

At 704, at least one cluster of paths is identified. The cluster of paths may be individual machine tracks associated with a similar heading angle (e.g., parallel). Two heading angles may be considered similar if they differ by less than a threshold amount (e.g., number of degrees), for example, 0.5°, 1°, 2°, 5°, or the like. The cluster of paths may be two or more individual machine tracks that are spatially adjacent within the field. Identifying the at least one cluster of paths may include identifying a cluster of curved individual machine tracks. For curved individual machine tracks, the cluster of paths may be two or more curved individual machine tracks associated with a similar change in heading angle. For example, the cluster of paths may be two or more curved individual machine tracks that are equidistant from each other and do not intersect (e.g., parallel curves).

At 706, changes in heading angle near the field boundary are identified. Changes in heading angle near the field boundary may be used to identify at least one headland, that is, the changes in heading angle near the field boundary may be located within a headland area of the field. The changes in heading angle near the field boundary may correspond to a machine turning around (e.g., a 180° turn).

At 708, overlapping machine paths near the field boundary are identified. Overlapping machine paths near the field boundary may be used to identify at least one headland, that is, the overlapping machine paths near the field boundary may be located within a headland area of the field. The at least one headland may be identified using a supervised machine learning model. The overlapping machine paths may include overlapping individual machine tracks. The overlapping machine paths may correspond to areas with more frequent machine travel.

At 710, at least one headland is generated. The at least one headland may be located near (e.g., adjacent to) the field boundary. The at least one headland may be generated based on the changes in heading angle and the overlapping machine paths. The at least one headland may be generated as an area of the field near the field boundary containing both changes in heading angle (e.g., a machine turning around) and overlapping paths. The at least one headland may be displayed at a client device.

At 712, at least one guidance zone is generated. The at least one guidance zone may be generated based on the at least one cluster of paths and the field boundary data. The at least one guidance zone may include (e.g., encompass, contain) the at least one cluster of paths (e.g., the individual machine tracks of the at least one cluster of paths). The at least one guidance zone may be generated within the field boundaries. The at least one guidance zone may be generated based on the at least one headland. The at least one guidance zone may be generated to exclude the at least one headland. For example, the at least one guidance zone may be generated to encompass the at least one cluster of paths and not encompass the at least one headland. The at least one guidance zone may be displayed at a client device.

The third technique 700 may further include generating vector values of the at least one guidance zone. Identifying the at least one cluster of paths at 704 may include creating a raster image of the field, assigning at least one visual attribute to pixels of the raster image, and identifying the at least one cluster of paths by applying an image segmentation model to the raster image. Identifying the at least one cluster of paths at 704 may further include using a CVML model to detect individual machine tracks associated with a similar heading angle. The raster image may be created by projecting the plurality of machine paths onto an image of the field. The at least one visual attribute assigned to pixels of the raster image may be based on, for example, a heading angle associated with the plurality of machine paths at the pixels, a feature derived using the heading angle, or other properties of the individual machine track. Alternatively, identifying the at least one cluster of paths at 704 may include clustering data points within the historical machine path data to cluster individual machine tracks associated with a similar heading angle. Generating the at least one guidance zone at 712 may include filtering the at least one cluster of paths to obtain at least one filtered region and converting the at least one filtered region into the at least one guidance zone. The at least one cluster of paths may be filtered based on size and shape characteristics. The vector values of the at least one guidance zone may be generated by projecting the guidance zone onto an image of the field (e.g., the raster image) and converting the guidance zone to, for example, latitude and longitude values.

The third technique 700 may further include identifying one or more split lines. Split lines are boundaries or demarcations generated within the field to separate contiguous or adjacent guidance zones. Split lines may vary in width and length based on factors such as the spatial distribution of guidance zones, machine path density, and/or operational constraints within the field. For example, a split line may be displayed at a client device separating a first guidance zone from a second guidance zone. A split line may be identified to separate a guidance zone from the at least one guidance zone. Generating the at least one guidance zone at 712 may include generating two or more guidance zones separated by split lines.

The third technique 700 may further include processing the historical machine path data to remove nonconforming machine paths. Processing the historical machine path data may be performed before identifying the at least one cluster of paths at 704. Processing the historical machine path data may include identifying and filtering machine status data, normalizing heading angle data across the machine paths, and removing nonconforming data points. The nonconforming data points may be machine paths associated with values of the machine status data. For example, the nonconforming data points may be machine paths associated with machine idle states (e.g., a moving status of not moving) or implement inactive states (e.g., an implement status of inactive or not in use).

The third technique 700 may further include segmenting the machine paths into individual machine tracks. The machine paths may be segmented into individual machine tracks by examining the historical machine path data. For example, the machine paths may be segmented into individual machine tracks by examining at least one of turns, timestamps, sessions, or machine status. In another example, the machine paths may be segmented into individual machine tracks by analyzing sequential position data points to identify turns based on, for example, heading angle changes, grouping position data points between identified turns into individual machine tracks, classifying the individual machine tracks, and filtering the individual machine tracks. The individual machine tracks may be classified based on, for example, heading angle variation. The individual machine tracks may be classified as, for example, straight individual machine tracks or curved individual machine tracks. Filtering the individual machine tracks may include filtering based on, for example, at least one of timestamps, sessions, or machine status.

The third technique 700 may further include generating a planned path (e.g., an autonomous path plan or a guidance plan) for a machine to traverse the field. A planned path may be a pre-defined route or set of guidance lines that directs the movements of farming equipment across the field. A planned path ensures that various agricultural operations, such as planting, fertilizing, spraying, and harvesting, may be carried out in an organized and efficient manner. The planned path may be generated based on the at least one guidance zone, for example, the planned path may be within (e.g., contained by, encompassed by) a guidance zone. The machine may be configured to traverse (e.g., follow, maintain position along) the planned path through the field. The machine may traverse the planned path autonomously, for example, using an autonomous guidance system.

Figure 8:
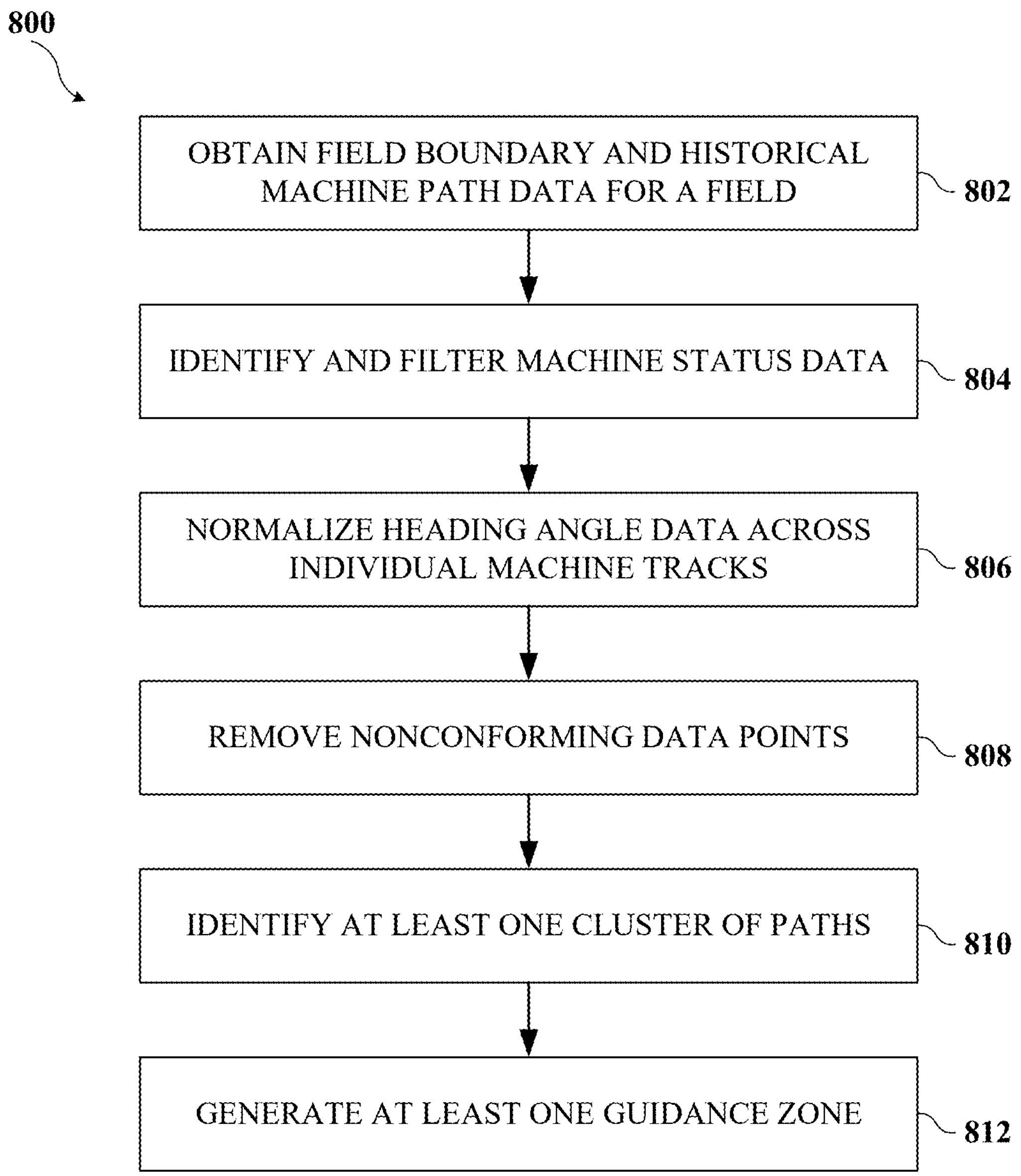
FIG. 8 is a flowchart of an example of a fourth technique for generating a guidance zone.

FIG. 8 is a flowchart of an example of a fourth technique 800 for generating a guidance zone. The fourth technique 800 can be executed using computing devices, such as the systems, hardware, and software described with respect to FIGS. 1-4. The fourth technique 800 can be performed, for example, by executing a machine-readable program or other computer-executable instructions, such as routines, instructions, programs, or other code. The steps, or operations, of the fourth technique 800, or another technique, method, process, or algorithm described in connection with the implementations disclosed herein can be implemented directly in hardware, firmware, software executed by hardware, circuitry, or a combination thereof.

At 802, field boundary data and historical machine path data for a field are obtained. The field boundary data and historical machine path data may be obtained from a database, for example, the historical database 302 of FIG. 3.

The historical machine path data may contain historical data associated with the machine and paths traversed by the machine. For example, the historical data associated with the machine may include telemetric data captured by the machine. The historical data associated with the machine may include a machine status, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location).

The historical data associated with the paths traversed by the machine may include a heading angle of a path, a location of the machine during the path, turns in the path, a timestamp of the path, a session of the path (e.g., traversed during a first session or a second session), or a machine status during the path. The historical machine path data may include a plurality of machine paths. Each machine path of the plurality of machine paths may include position data and associated heading angle data for that path. The historical machine path data may be segmented into individual machine tracks. An individual machine track refers to a segmented portion of a machine path between identified turns or operational changes (e.g., a portion of a machine path between two turn-around points at opposite ends of the field). Multiple sequential position points of a machine path may be grouped into individual machine tracks based on heading angle changes (e.g., identified turns), timestamps, operating sessions, or implement status.

At 804, machine status data is identified and filtered. The machine status data may be included in the historical machine path data. The machine status data may include, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location). The machine status data may be filtered to remove duplicate or redundant path data, normalize timestamp data to correct inconsistencies, and align position data, for example, to correct for GPS drift. The machine status data may be filtered to interpolate missing position data for short gaps in machine paths and remove erroneous outliers caused by temporary signal loss or sensor malfunctions.

At 806, heading angle data is normalized across individual machine tracks. The heading angle may be rounded to a nearest whole number (e.g., 0°), tenth (e.g., 0.0°), hundredth (e.g., 0.00°), or the like. The heading angle data may be normalized such that it is non-directional. For example, a heading angle of 0° (true north) and a heading angle of 180° (true south) may be normalized such that they are considered a same heading angle. The heading angle data may be normalized into representative heading angles. For example, each individual machine track may be assigned a representative heading angle based on the heading angle of the individual machine track, for example, based on the heading angle being different from the representative heading angle by less than a threshold amount. In another example, normalizing the heading angle data may include assigning a representative heading angle to an entire machine path.

The machine paths may contain curved individual machine tracks. A curved individual machine track may be a path associated with a change in heading angle along a portion of a machine path. For example, the curved individual machine track may have a first heading angle for a first portion of the curved individual machine track and a second heading angle for a second portion of the curved individual machine track. Normalizing the heading angle data for curved individual machine tracks may include normalizing the curved individual machine tracks into representative changes in heading angles. For example, each curved individual machine track may be assigned a representative change in heading angle based on the change in heading angle along the individual machine track or by the first heading angle and the second heading angle.

At 808, nonconforming data points are removed. The nonconforming data points may be machine paths (e.g., individual machine tracks) associated with values of the machine status data. For example, data points associated with the machine traversing a road rather than the field may be removed. The nonconforming data points may be removed based on a machine status, a turning status, a speed of the machine, a working status, an implement status, or a location of the machine. For example, the nonconforming data points may be machine paths associated with machine idle states (e.g., a moving status of not moving) or implement inactive states (e.g., an implement status of inactive or not in use).

At 810, at least one cluster of paths is identified. The cluster of paths may be individual machine tracks associated with a similar heading angle (e.g., parallel). The cluster of paths may be individual machine tracks associated with a same normalized heading angle. Two heading angles may be considered similar if they differ by less than a threshold amount (e.g., number of degrees), for example, 0.5°, 1°, 2°, 5°, or the like. The cluster of paths may be two or more individual machine tracks that are spatially adjacent within the field. Identifying the at least one cluster of paths may include identifying a cluster of curved individual machine tracks. For curved individual machine tracks, the cluster of paths may be two or more curved individual machine tracks associated with a similar change in heading angle or a same representative change in heading angle. For example, the cluster of paths may be two or more curved individual machine tracks that are equidistant from each other and do not intersect (e.g., parallel curves).

At 812, at least one guidance zone is generated. The at least one guidance zone may be generated based on the at least one cluster of paths and the field boundary data. The at least one guidance zone may include (e.g., encompass, contain) the at least one cluster of paths (e.g., the individual machine tracks of the at least one cluster of paths). The at least one guidance zone may be generated within the field boundaries. The at least one guidance zone may be displayed at a client device.

The fourth technique 800 may further include generating vector values of the at least one guidance zone. Identifying the at least one cluster of paths at 810 may include creating a raster image of the field, assigning at least one visual attribute to pixels of the raster image, and identifying the at least one cluster of paths by applying an image segmentation model to the raster image. Identifying the at least one cluster of paths at 810 may further include using a CVML model to detect individual machine tracks associated with a similar heading angle. The raster image may be created by projecting the plurality of machine paths onto an image of the field. The at least one visual attribute assigned to pixels of the raster image may be based on, for example, a heading angle associated with the plurality of machine paths at the pixels, a feature derived using the heading angle, or other properties of the individual machine track. Alternatively, identifying the at least one cluster of paths at 810 may include clustering data points within the historical machine path data to cluster individual machine tracks associated with a similar heading angle. Generating the at least one guidance zone at 812 may include filtering the at least one cluster of paths to obtain at least one filtered region and converting the at least one filtered region into the at least one guidance zone. The at least one cluster of paths may be filtered based on size and shape characteristics. The vector values of the at least one guidance zone may be generated by projecting the guidance zone onto an image of the field (e.g., the raster image) and converting the guidance zone to, for example, latitude and longitude values.

The fourth technique 800 may further include identifying at least one headland of the field. The at least one headland may be identified before generating the at least one guidance zone. The at least one headland may be identified based on the machine paths. For example, identifying the at least one headland of the field may include identifying changes in heading angle of the machine paths near the field boundary and identifying overlapping portions of machine paths near the field boundaries. The at least one headland may be identified using a supervised machine learning model. Generating the at least one headland may be based on changes in the heading angle and the overlapping machine paths. The at least one headland may be displayed at a client device. Generating the at least one guidance zone at 812 may include generating the at least one guidance zone to exclude the at least one headland.

The fourth technique 800 may further include identifying one or more split lines. Split lines are boundaries or demarcations generated within the field to separate contiguous or adjacent guidance zones. Split lines may vary in width and length based on factors such as the spatial distribution of guidance zones, machine path density, and/or operational constraints within the field. For example, a split line may be displayed at a client device separating a first guidance zone from a second guidance zone. A split line may be identified to separate a guidance zone from the at least one guidance zone. Generating the at least one guidance zone at 812 may include generating two or more guidance zones separated by split lines.

The fourth technique 800 may further include segmenting the machine paths into individual machine tracks. The machine paths may be segmented into individual machine tracks by examining the historical machine path data. For example, the machine paths may be segmented into individual machine tracks by examining at least one of turns, timestamps, sessions, or machine status. In another example, the machine paths may be segmented into individual machine tracks by analyzing sequential position data points to identify turns based on, for example, heading angle changes, grouping position data points between identified turns into individual machine tracks, classifying the individual machine tracks, and filtering the individual machine tracks. The individual machine tracks may be classified based on, for example, heading angle variation. The individual machine tracks may be classified as, for example, straight individual machine tracks or curved individual machine tracks. Filtering the individual machine tracks may include filtering based on, for example, at least one of timestamps, sessions, or machine status.

The fourth technique 800 may further include generating a planned path (e.g., an autonomous path plan or a guidance plan) for a machine to traverse the field. A planned path may be a pre-defined route or set of guidance lines that directs the movements of farming equipment across the field. A planned path ensures that various agricultural operations, such as planting, fertilizing, spraying, and harvesting, may be carried out in an organized and efficient manner. The planned path may be generated based on the at least one guidance zone, for example, the planned path may be within (e.g., contained by, encompassed by) a guidance zone. The machine may be configured to traverse (e.g., follow, maintain position along) the planned path through the field. The machine may traverse the planned path autonomously, for example, using an autonomous guidance system.

Figure 9:
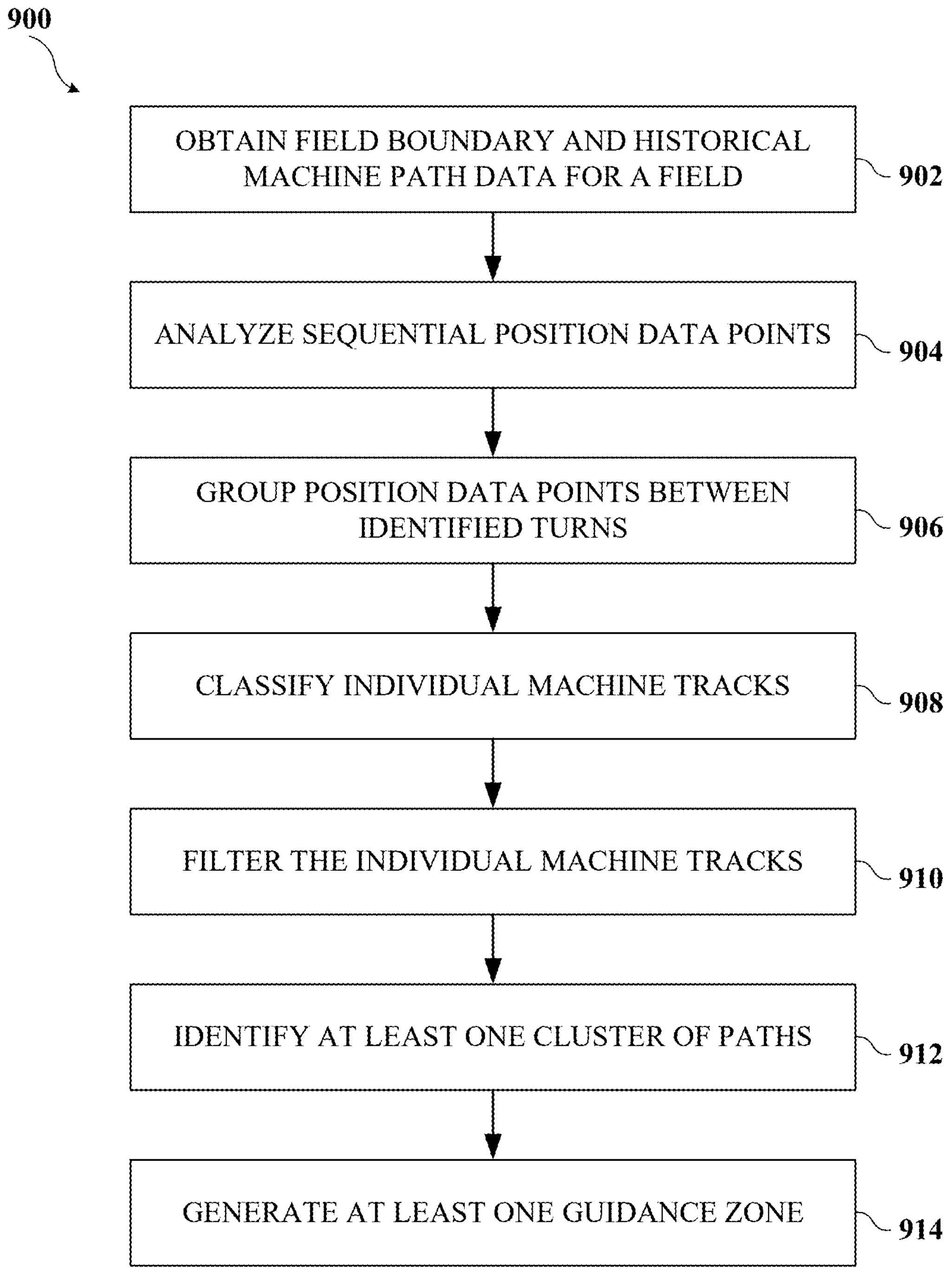
FIG. 9 is a flowchart of an example of a fifth technique for generating a guidance zone.

FIG. 9 is a flowchart of an example of a fifth technique 900 for generating a guidance zone. The fifth technique 900 can be executed using computing devices, such as the systems, hardware, and software described with respect to FIGS. 1-4. The fifth technique 900 can be performed, for example, by executing a machine-readable program or other computer-executable instructions, such as routines, instructions, programs, or other code. The steps, or operations, of the fifth technique 900, or another technique, method, process, or algorithm described in connection with the implementations disclosed herein can be implemented directly in hardware, firmware, software executed by hardware, circuitry, or a combination thereof.

At 902, field boundary data and historical machine path data for a field are obtained. The field boundary data and historical machine path data may be obtained from a database, for example, the historical database 302 of FIG. 3.

The historical machine path data may contain historical data associated with the machine and paths traversed by the machine. For example, the historical data associated with the machine may include telemetric data captured by the machine. The historical data associated with the machine may include a machine status, for example, a moving status of the machine (e.g., moving or not moving), a turning status of the machine (e.g., turning or not turning), a speed of the machine (e.g., a current speed value in, for example, miles per hour), a working status of the machine (e.g., working or not working), an implement status (e.g., active or inactive, or in use or not in use), or a location of the machine (e.g., a GPS location).

The historical data associated with the paths traversed by the machine may include a heading angle of a path, a location of the machine during the path, turns in the path, a timestamp of the path, a session of the path (e.g., traversed during a first session or a second session), or a machine status during the path. The historical machine path data may include a plurality of machine paths. Each machine path of the plurality of machine paths may include position data and associated heading angle data for that path.

At 904, sequential position data points are analyzed. The sequential position data points may be analyzed to segment the plurality of machine paths into individual machine tracks. An individual machine track refers to a segmented portion of a machine path between identified turns or operational changes (e.g., a portion of a machine path between two turn-around points at opposite ends of the field). The sequential position data points may be analyzed to identify turns, for example, based on heading angle changes. For example, changes in heading angle between multiple (e.g., two or more) sequential position data points may indicate a turn. The change in heading angle between two sequential position data points may be a minor change in heading angle and may not indicate a turn.

At 906, position data points between identified turns are grouped. Multiple sequential position points of a machine path may be grouped into individual machine tracks based on heading angle changes (e.g., identified turns). For example, all position data points between two identified turns may be grouped into an individual machine track.

At 908, individual machine tracks are classified. The individual machine tracks may be classified based on, for example, heading angle variation. The individual machine tracks may be classified as, for example, straight individual machine tracks or curved individual machine tracks. The individual machine tracks may be classified by associating each individual machine track with a heading angle (e.g., label individual machine tracks as an individual machine track with a heading angle of, for example, 0°).

At 910, the individual machine tracks are filtered. The individual machine tracks may be filtered based on at least one of timestamps (e.g., temporally sequential individual machine tracks), operating sessions (e.g., individual machine tracks within a same operating session), or implement status (e.g., active or inactive, or in use or not in use). Filtering the individual machine tracks may remove inactive, not useful, or nonconforming data. For example, filtering the individual machine tracks based on timestamps may remove individual machine tracks made at a time before or after an operation time (e.g., individual machine tracks made before farming operations start or after farming operations end). Filtering the individual machine tracks based on operating sessions may remove individual machine tracks made during a different (e.g., separate) operating session. Filtering the individual machine tracks based on implement status may remove individual machine tracks associated with a particular implement status, for example, inactive or not in use.

At 912, at least one cluster of paths is identified. The cluster of paths may be individual machine tracks associated with a similar heading angle (e.g., parallel). Two heading angles may be considered similar if they differ by less than a threshold amount (e.g., number of degrees), for example, 0.5°, 1°, 2°, 5°, or the like. The cluster of paths may be two or more individual machine tracks that are spatially adjacent within the field. Identifying the at least one cluster of paths may include identifying a cluster of curved individual machine tracks. For curved individual machine tracks, the cluster of paths may be two or more curved individual machine tracks associated with a similar change in heading angle. For example, the cluster of paths may be two or more curved individual machine tracks that are equidistant from each other and do not intersect (e.g., parallel curves).

At 914, at least one guidance zone is generated. The at least one guidance zone may be generated based on the at least one cluster of paths and the field boundary data. The at least one guidance zone may include (e.g., encompass, contain) the at least one cluster of paths (e.g., the individual machine tracks of the at least one cluster of paths). The at least one guidance zone may be generated within the field boundaries. The at least one guidance zone may be displayed at a client device.

The fifth technique 900 may further include generating vector values of the at least one guidance zone. Identifying the at least one cluster of paths at 912 may include creating a raster image of the field, assigning at least one visual attribute to pixels of the raster image, and identifying the at least one cluster of paths by applying an image segmentation model to the raster image. Identifying the at least one cluster of paths at 912 may further include using a CVML model to detect individual machine tracks associated with a similar heading angle. The raster image may be created by projecting the plurality of machine paths onto an image of the field. The at least one visual attribute assigned to pixels of the raster image may be based on, for example, a heading angle associated with the plurality of machine paths at the pixels, a feature derived using the heading angle, or other properties of the individual machine track. Alternatively, identifying the at least one cluster of paths at 912 may include clustering data points within the historical machine path data to cluster individual machine tracks associated with a similar heading angle. Generating the at least one guidance zone at 914 may include filtering the at least one cluster of paths to obtain at least one filtered region and converting the at least one filtered region into the at least one guidance zone. The at least one cluster of paths may be filtered based on size and shape characteristics. The vector values of the at least one guidance zone may be generated by projecting the guidance zone onto an image of the field (e.g., the raster image) and converting the guidance zone to, for example, latitude and longitude values.

The fifth technique 900 may further include identifying at least one headland of the field. The at least one headland may be identified before generating the at least one guidance zone. The at least one headland may be identified based on the machine paths. For example, identifying the at least one headland of the field may include identifying changes in heading angle of the machine paths near the field boundary and identifying overlapping portions of machine paths near the field boundaries. The at least one headland may be identified using a supervised machine learning model. Generating the at least one headland may be based on changes in the heading angle and the overlapping machine paths. The at least one headland may be displayed at a client device. Generating the at least one guidance zone at 914 may include generating the at least one guidance zone to exclude the at least one headland.

The fifth technique 900 may further include identifying one or more split lines. Split lines are boundaries or demarcations generated within the field to separate contiguous or adjacent guidance zones. Split lines may vary in width and length based on factors such as the spatial distribution of guidance zones, machine path density, and/or operational constraints within the field. For example, a split line may be displayed at a client device separating a first guidance zone from a second guidance zone. A split line may be identified to separate a guidance zone from the at least one guidance zone. Generating the at least one guidance zone at 914 may include generating two or more guidance zones separated by split lines.

The fifth technique 900 may further include processing the historical machine path data to remove nonconforming machine paths. Processing the historical machine path data may be performed before identifying the at least one cluster of paths at 912. Processing the historical machine path data may include identifying and filtering machine status data, normalizing heading angle data across the machine paths (e.g., the individual machine tracks), and removing nonconforming data points. The nonconforming data points may be machine paths (e.g., individual machine tracks) associated with values of the machine status data. For example, the nonconforming data points may be machine paths associated with machine idle states (e.g., a moving status of not moving) or implement inactive states (e.g., an implement status of inactive or not in use).

The fifth technique 900 may further include generating a planned path (e.g., an autonomous path plan or a guidance plan) for a machine to traverse the field. A planned path may be a pre-defined route or set of guidance lines that directs the movements of farming equipment across the field. A planned path ensures that various agricultural operations, such as planting, fertilizing, spraying, and harvesting, may be carried out in an organized and efficient manner. The planned path may be generated based on the at least one guidance zone, for example, the planned path may be within (e.g., contained by, encompassed by) a guidance zone. The machine may be configured to traverse (e.g., follow, maintain position along) the planned path through the field. The machine may traverse the planned path autonomously, for example, using an autonomous guidance system.

For simplicity of explanation, the first technique 500, the second technique 600, the third technique 700, the fourth technique 800, and the fifth technique 900 are depicted and described herein as a respective series of steps or operations. However, the steps or operations of the first technique 500, the second technique 600, the third technique 700, the fourth technique 800, and the fifth technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random-access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or additionally, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "and/or" encompasses its plain and ordinary meaning and may refer to either an intersection or a union of sets of data. In a first example, the phrase "A and/or B" encompasses the intersection of A and B. In a second example, the phrase "A and/or B" encompasses the union of A and B.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various implementations of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one implementation may be combined with those of another implementation without departing from the scope of the present disclosure to achieve any desired result and will appreciate further features and advantages of the presently disclosed subject matter based on the description provided. Variations, combinations, and/or modifications to any of the implementations and/or features of the implementations described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately)) 225°. The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A method, comprising:

obtaining a field boundary and historical machine path data for a field, wherein the historical machine path data comprises a plurality of machine paths segmented into machine tracks, and wherein each machine track comprises respective position data and corresponding heading angle data;

identifying at least one cluster of paths comprising individual machine tracks associated with a similar heading angle; and generating, based on the at least one cluster of paths, at least one guidance zone within the field boundary, wherein the at least one guidance zone includes the individual machine tracks of the at least one cluster of paths.

2. The method of claim 1, wherein identifying the at least one cluster of paths comprises:

creating a raster image by projecting the plurality of machine paths onto an image of the field;

assigning at least one visual attribute to pixels of the raster image based on a heading angle associated with the plurality of machine paths at the pixels; and identifying, by applying an image segmentation model to the raster image, the at least one cluster of paths comprising individual machine tracks associated with a similar heading angle; and wherein generating the at least one guidance zone comprises:

filtering the at least one cluster of paths based on size and shape characteristics to obtain at least one filtered region; and converting the at least one filtered region into at least one guidance zone polygon.

3. The method of claim 2, wherein identifying, by applying the image segmentation model to the raster image, the at least one cluster of paths comprises:

identifying a first cluster of paths based on a first visual attribute; and identifying a second cluster of paths based on a second visual attribute; and wherein converting the at least one filtered region into the at least one guidance zone polygon comprises:

generating a first guidance zone polygon including individual machine tracks of the first cluster of paths; and generating a second guidance zone polygon including individual machine tracks of the second cluster of paths.

4. The method of claim 2, further comprising:

generating vector values of the at least one guidance zone by:

projecting a guidance zone polygon of the at least one guidance zone polygon onto an image of the field; and converting the guidance zone polygon to latitude and longitude values.

5. The method of claim 2, wherein identifying the at least one cluster of paths comprises using a computer vision and machine learning (CVML) model to detect individual machine tracks associated with a similar heading angle.

6. The method of claim 1, wherein identifying the at least one cluster of paths comprises clustering data points within the historical machine path data to cluster individual machine tracks associated with a similar heading angle.

7. The method of claim 1, further comprising:

identifying, based on the plurality of machine paths, at least one headland of the field, wherein generating the at least one guidance zone comprises generating the at least one guidance zone to exclude the at least one headland.

8. The method of claim 7, wherein identifying the at least one headland comprises:

identifying changes in heading angle of machine paths near the field boundary;

identifying overlapping machine paths near the field boundary; and generating the at least one headland based on the changes in heading angle and the overlapping machine paths.

9. The method of claim 1, wherein identifying the at least one cluster of paths comprises identifying a cluster of curved individual machine tracks comprising individual machine tracks associated with a similar change in heading angle.

10. The method of claim 1, further comprising:

generating, using the at least one guidance zone, a planned path for a machine to traverse the field; and traversing, autonomously by the machine, the planned path.

11. The method of claim 1, further comprising:

processing, before identifying the at least one cluster of paths, the historical machine path data to remove nonconforming machine paths, wherein the processing comprises:

identifying and filtering machine status data comprising at least one of active implement status, machine speed, or machine heading;

normalizing heading angle data across the individual machine tracks; and removing nonconforming data points associated with machine idle states or implement inactive states.

12. The method of claim 1, wherein the historical machine path data comprises historical data associated with at least one of a moving status, a turning status, a working status, or a location.

13. The method of claim 1, further comprising:

segmenting the plurality of machine paths into individual machine tracks by examining at least one of turns, timestamps, sessions, or machine status.

14. The method of claim 1, further comprising:

segmenting the plurality of machine paths into the machine tracks by:

analyzing sequential position data points to identify turns based on heading angle changes;

grouping position data points between identified turns into individual machine tracks; and classifying the individual machine tracks as straight individual machine tracks or curved individual machine tracks based on heading angle variation; and filtering the individual machine tracks based on at least one of timestamps, machine operating sessions, or implement status.

15. A system, comprising:

one or more memories; and one or more processors, the processors configured to execute instructions stored in the one or more memories to:

obtain a field boundary and historical machine path data for a field, wherein the historical machine path data comprises a plurality of machine paths segmented into machine tracks, and wherein each machine track comprises respective position data and corresponding heading angle data;

identify at least one cluster of paths comprising individual machine tracks associated with a similar heading angle; and generate, based on the at least one cluster of paths, at least one guidance zone within the field boundary, wherein the at least one guidance zone includes the individual machine tracks of the at least one cluster of paths.

16. The system of claim 15, wherein the one or more processors are further configured to execute instructions stored in the one or more memories to:

identify, based on the plurality of machine paths, at least one headland of the field, wherein the instructions to generate the at least one guidance zone comprise instructions to generate the at least one guidance zone to exclude the at least one headland.

17. The system of claim 16, wherein the one or more processors are further configured to execute instructions stored in the one or more memories to:

display, at a client device, the at least one headland; and display, at the client device, a split line separating a first guidance zone and a second guidance zone.

18. The system of claim 15, wherein the one or more processors are further configured to execute instructions stored in the one or more memories to:

receive, from a client device, desired crop yield information; and determine a guidance zone of the at least one guidance zone corresponding to the desired crop yield information.

19. The system of claim 15, wherein the one or more processors are further configured to execute instructions stored in the one or more memories to:

display the at least one guidance zone at a client device.

20. One or more non-transitory computer-readable media storing instructions operable to cause one or more processors to perform operations comprising:

obtaining a field boundary and historical machine path data for a field, wherein the historical machine path data comprises a plurality of machine paths segmented into machine tracks, and wherein each machine track comprises respective position data and corresponding heading angle data;

identifying at least one cluster of paths comprising individual machine tracks associated with a similar heading angle; and generating, based on the at least one cluster of paths, at least one guidance zone within the field boundary, wherein the at least one guidance zone includes the individual machine tracks of the at least one cluster of paths.

* * * * *